(12) United States Patent
Yadav et al.

(10) Patent No.: US 12,061,523 B2
(45) Date of Patent: Aug. 13, 2024

(54) SYSTEM AND METHOD FOR PARALLELIZATION BACKUP OF A FOLDER INCLUDING A LARGE SET OF FILES STORED IN A NETWORK ATTACHED STORAGE

(71) Applicant: Dell Products L.P., Round Rock, TX (US)

(72) Inventors: Sunil Yadav, Bangalore (IN); Shelesh Chopra, Bangalore (IN)

(73) Assignee: DELL PRODUCT L.P., Round Rock, TX (US)

( * ) Notice: Subject to any disclaimer, the term of this patent is extended or adjusted under 35 U.S.C. 154(b) by 93 days.

(21) Appl. No.: 17/872,625

(22) Filed: Jul. 25, 2022

(65) Prior Publication Data

US 2024/0028462 A1 Jan. 25, 2024

(51) Int. Cl.
G06F 11/14 (2006.01)
(52) U.S. Cl.
CPC ...... *G06F 11/1451* (2013.01); *G06F 11/1464* (2013.01); *G06F 2201/84* (2013.01)
(58) Field of Classification Search
CPC ............ G06F 11/1451; G06F 11/1464; G06F 2201/84
See application file for complete search history.

(56) References Cited

U.S. PATENT DOCUMENTS

| | | | |
|---|---|---|---|
| 7,865,663 B1 | 1/2011 | Nelson et al. | |
| 9,626,120 B1 * | 4/2017 | Jia | G06F 13/102 |
| 9,626,373 B2 | 4/2017 | Ram | |
| 10,069,909 B1 | 9/2018 | Chopra et al. | |
| 10,078,555 B1 | 9/2018 | Kumar et al. | |
| 10,284,645 B1 | 5/2019 | Thiam | |
| 10,289,494 B1 | 5/2019 | Chopra et al. | |
| 10,656,841 B1 * | 5/2020 | Huang | G06F 3/0659 |
| 11,042,512 B1 | 6/2021 | Bono et al. | |
| 2003/0158831 A1 | 8/2003 | Zaremba | |
| 2004/0267752 A1 | 12/2004 | Wong et al. | |
| 2006/0206547 A1 | 9/2006 | Kulkarni et al. | |
| 2010/0280994 A1 | 11/2010 | Radon et al. | |

(Continued)

FOREIGN PATENT DOCUMENTS

| | | |
|---|---|---|
| CN | 101169796 A | 4/2008 |
| CN | 106227830 A | 12/2016 |
| JP | 2006325725 A | 12/2006 |

*Primary Examiner* — Brittany N Allen
*Assistant Examiner* — William P Bartlett
(74) *Attorney, Agent, or Firm* — Chamberlain, Hrdlicka, White, Williams & Aughtry; Aly Z. Dossa

(57) ABSTRACT

A method for managing data include obtaining, by a universal connector, a backup request for a set of files, in response to the backup request: performing a batching of file read requests for data associated with the set of files to obtain a set of file read batches, sending the set of file read batches to a network attached storage (NAS) server, obtaining a response for each of the set of file read batches from the NAS server, wherein the response for each of the set of file read batches comprise a portion of the data, wherein at least two responses for the set of file read batches are obtained in parallel, writing the portion of the data to a backup container in parallel with the obtaining, and initiating a backup of the set of files using the backup container after the writing is completed.

20 Claims, 18 Drawing Sheets

(56) References Cited

U.S. PATENT DOCUMENTS

| | | |
|---|---|---|
| 2011/0302138 A1 | 12/2011 | Cesario |
| 2013/0110784 A1* | 5/2013 | Guo .................... G06F 11/1448 |
| | | 707/649 |
| 2014/0181016 A1 | 6/2014 | Whitehead et al. |
| 2015/0234703 A1 | 8/2015 | Udayashankar et al. |
| 2015/0301930 A1 | 10/2015 | Bruner et al. |
| 2016/0065671 A1 | 3/2016 | Nallathambi et al. |
| 2017/0004047 A1 | 1/2017 | Deshmukh |
| 2017/0083406 A1 | 3/2017 | Qi et al. |
| 2018/0137139 A1* | 5/2018 | Bangalore ........... G06F 16/2379 |
| 2019/0235968 A1* | 8/2019 | Bono .................. H04L 67/1095 |
| 2019/0235972 A1* | 8/2019 | Bono .................. G06F 16/1824 |
| 2019/0319785 A1 | 10/2019 | Kumar et al. |
| 2019/0340082 A1 | 11/2019 | Pradhan |
| 2020/0174892 A1* | 6/2020 | Muehge ................ G06F 3/0659 |
| 2020/0356450 A1 | 11/2020 | Littlefield et al. |
| 2021/0133045 A1 | 5/2021 | Zhong et al. |
| 2021/0182160 A1 | 6/2021 | Sharma et al. |
| 2021/0397583 A1 | 12/2021 | Koppaka et al. |
| 2022/0300198 A1 | 9/2022 | Gao et al. |
| 2022/0334729 A1 | 10/2022 | Viveney et al. |
| 2022/0334925 A1 | 10/2022 | Rakesh et al. |
| 2022/0414103 A1 | 12/2022 | Upadhyay et al. |
| 2023/0297477 A1 | 9/2023 | Yadav et al. |

\* cited by examiner

SYSTEM AND METHOD FOR PARALLELIZATION BACKUP OF A FOLDER INCLUDING A LARGE SET OF FILES STORED IN A NETWORK ATTACHED STORAGE

BACKGROUND

Computing devices in a system may include any number of internal components such as processors, memory, and persistent storage. The computing devices may execute applications (e.g., software). The data utilized by the applications may be stored in a network attached storage (NAS).

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
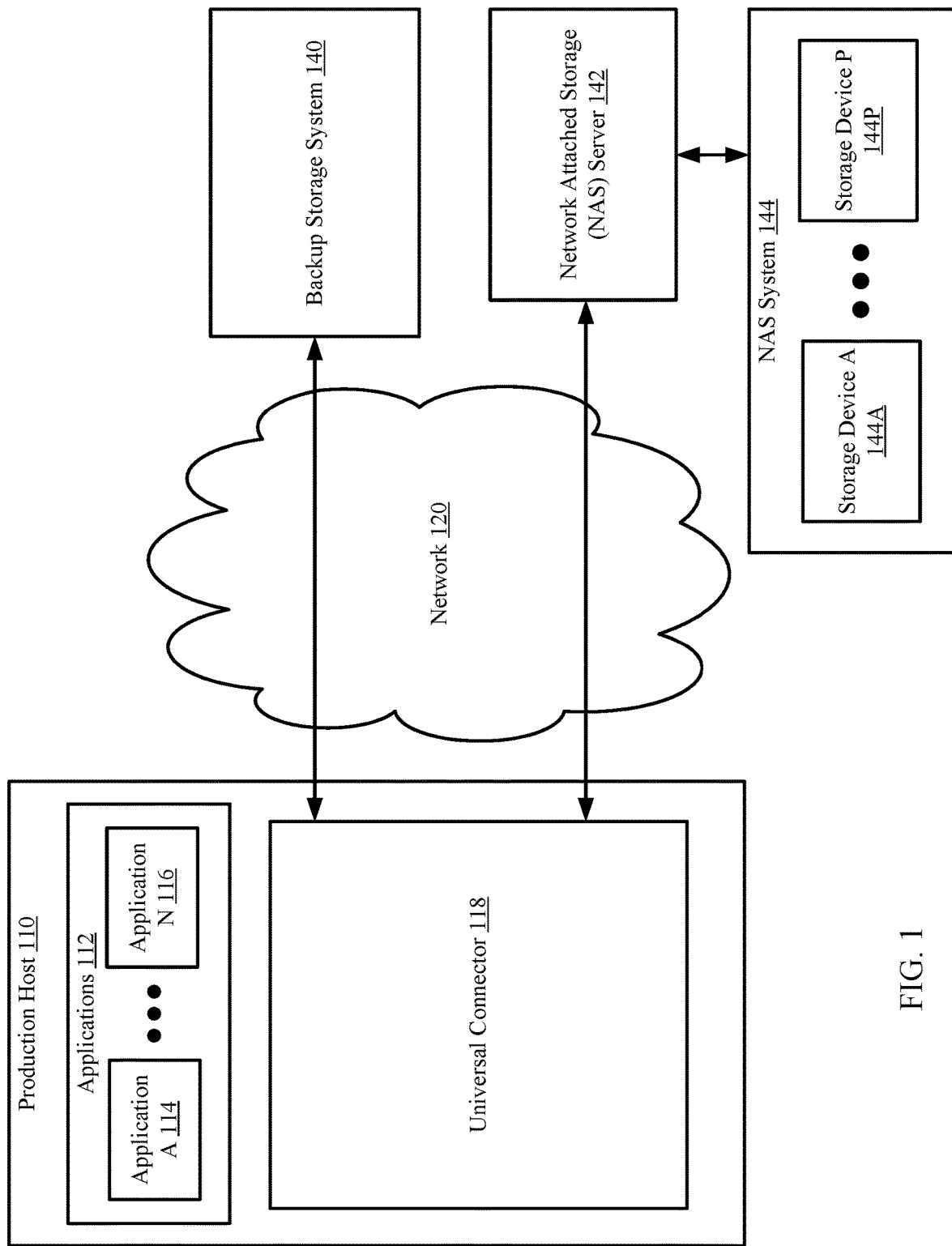
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

As used herein, the term operatively connected, or operative connection, means that there exists between elements/components/devices a direct or indirect connection that allows the elements to interact with one another in some way. For example, the term 'operatively connected' may refer to any direct (e.g., wired and/or wireless directly between two devices or components) or indirect (e.g., wired and/or wireless connections between any number of devices or components connecting the connected devices) connection. Thus, any path through which information may travel may be considered an operative connection.

In general, embodiments of the invention relate to a method and system for managing data. Specifically, embodiments of the invention include a method and system for managing the backups of data. Specifically, embodiments provide a method for providing an efficient and agnostic user space that is used for the management of data stored in a network attached storage (NAS) server. The user space disclosed herein may utilize efficient a universal connector that provides data storage management services for a variety of workloads. The variety of workloads may include, for example, workloads for backing up large numbers of files, backing up files of large sizes, backing up at high frequency of intervals, workloads for incremental backups, workloads for accessing large numbers of files, and workloads that implement two or more protocols (e.g., network file system (NFS), server message block (SMB), etc.). Embodiments of this invention provide methods and systems for managing the variety of workloads disclosed herein while maintaining efficient execution of the workloads.

In one or more embodiments of the invention, the client devices may execute one or more applications that access the universal connector. The universal connector may provide multi-threaded connections to process multiple workloads. The universal connector may be protocol agnostic. In other words, the universal connector may include functionality for implementing multiple protocols (e.g., implemented by the applications and/or a network attached storage (NAS) server that communicates with the universal connector when servicing the workloads).

In one or more embodiments of the invention, the universal connector provides a method for optimizing a backup for a large number of smaller sized files. The method includes identifying a set of small files in a backup request, performing a batching of the set of small files to obtain a set of batches, and sending backup service requests to the NAS server in accordance with the set of batches to obtain the file data for the. For example, each backup service request may correspond to one of the batches of small files.

In one or more embodiments, the universal connector includes functionality for managing incremental backups.

The method includes obtaining requests for metadata (associated with the incremental backups) from the applications, batching the requests, and sending a batched version of metadata requests to a NAS server. The batched version of the requests may be for metadata associated with a file system of the incremental backup. The universal connector may receive the requested metadata from the NAS server, and, in response, may perform the incremental backups using the obtained metadata.

In one or more embodiments, the universal connector includes functionality for managing the network bandwidth between the NAS server and the universal connector executing on a client device. The method includes reducing the number of roundtrips (e.g., the number of times a portion of a backup is transferred to and from the NAS server by batching requests at the universal connector before the requests are issued to the NAS server.

In one or more embodiments, the universal connector includes functionality for performing feedback-based batching operations based on resource availability of the NAS server. The method includes monitoring, by the universal connector, the resource availability of the NAS server. The monitored resources may include, for example, the network bandwidth between the universal connector and the NAS server, the storage availability of the NAS server, memory usage of the NAS server, and processing (e.g., central processing unit (CPU)) usage of the NAS server.

In one or more embodiments, the universal connector includes functionality for parallelizing the processing of workloads that include folders with a large number (e.g., millions) of files. The method includes obtaining a request for backing up a large folder (e.g., a folder with millions of files), identifying a set of portions of the folder, generating virtual folders that are each one of the portions of the folder and collectively include the files in the folder, processing (e.g., performing a backup) of each of the virtual folders concurrently (i.e., in parallel), and instructing the NAS server to combine the backups of the virtual folders to generate the backup of the original folder.

In one or more embodiments, the universal connector includes functionality for intelligently caching information associated with workloads to manage the sequencing the operations of the workloads. The method includes dynamically managing the buffers for reading and writing queues based on the resource availability of the universal connector and/or the NAS server such that the network is more efficiently utilized based on the size and/or the number of workload requests. For example, the buffers may be increased in size if the number of workloads is low while the size of the backups for each workload is large. Conversely, the number of buffers may be increased (and the size of said buffers may be reduced) if the number of workloads increases.

In one or more embodiments, the universal connector includes functionality for performing block-based incremental backups of a file-based backup. In contrast to backing up entire files in a file-based backup whenever a file changes, embodiments disclosed herein relate to performing backups of changed data blocks associated with a changed file and storing the changed blocks (e.g., a portion of a changed file) in the incremental backups. In this manner, less generation of data is required for each incremental backup to secure the same amount of data as, for example, a per-changed-file incremental backup.

In one or more embodiments, the universal connector includes functionality for supporting the backup of multiple versions of a file and/or of a folder in one backup session.

The method includes obtaining a request to backup a file and/or folder, obtaining, using metadata for the file and/or folder, the versions of the file and/or folder for backup, and initiating a backup of the obtained versions of the file and/or folder.

Various embodiments of the invention are described below.

FIG. 1 shows an example system in accordance with one or more embodiments of the invention. The system includes a production host (110) that includes one or more applications (112) and a universal connector (118), a backup storage (140), a network attached storage (NAS) server (142), and a NAS system (144). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the production host (110) may include applications (112). The applications (114, 116) may be logical entities executed using computing resources (not shown) of the production host (110). Each of the applications (114, 116) may be performing similar or different processes. In one or more embodiments of the invention, the applications (112) provide services to users, e.g., clients (not shown). For example, the applications (112) may host components. The components may be, for example, instances of databases, email servers, and/or other components. The applications (112) may host other types of components without departing from the invention. An application (112) may be executed on one or more production hosts as instances of the application.

In one or more embodiments, the applications (112) may utilize a file system to manage the storage of data. In one or more embodiments of the invention, a file system is an organizational data structure that tracks how data is stored and retrieved in a system. The file system may specify references to files and any data blocks associated with each file. Each data block may include a portion of application data for an application. In one or more embodiments, the file data, application data, and/or other data utilized by the applications (112) are stored in the NAS system (144). The aforementioned data is accessed by the applications (112) via a universal connector (118). The universal connector (118) may access the data in the NAS system (144) via communication with a NAS server (142) (further discussed below).

In one or more of embodiments of the invention, the applications (112) are implemented as computer instructions, e.g., computer code, stored on a persistent storage that when executed by a processor(s) of a computing device cause the computing device to provide the functionality of the applications (112) described throughout this application.

In one or more embodiments, the universal connector (118) includes functionality for servicing requests issued by the applications (112). The applications (112) may issue requests for performing workloads associated with the data accessed by the applications (112). The workloads may include workloads for backing up the application data, for accessing one or more files from the NAS system (144), for performing incremental backups of the application data, and/or any other workloads without departing from the invention. In one or more embodiments, the universal connector (118) services requests for workloads in accordance with FIGS. 2-9.

In one or more embodiments, the universal connector (118) includes functionality for managing a universal library of two or more protocols that are utilized by the applications (112). In this manner, each application (114, 116) may operate using a protocol such that the universal connector (118) may service the multiple protocols utilized by the collective applications (112). Examples of the protocols included in the universal library include, but are not limited to: network file system (NFS), server message block (SMB), and common internet file system (CIFS). For example, the universal connector (118) may provide an application programming interface (API) for each application (114, 116) and/or for each protocol provided by the universal connector (118).

In one or more embodiments, the universal connector (118) further includes functionality for modifying the requests to a format readable to the NAS server (144). The universal connector (118) may further send the modified request to the NAS server (142). In this manner, the applications (112) are not required to modify their requests to a format readable to the NAS server (142).

While illustrated as a part of the production host (110), the universal connector (118) may be a separate entity. For example, the universal connector is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the universal connector (118) described throughout this application and/or all, or a portion thereof, of the methods illustrated in FIGS. 2-9.

While not illustrated in FIG. 1, the system of FIG. 1 may include multiple production hosts. Each production host may operate independently from each other. Each production host may include an operable connection to the backup storage system (140) and/or the NAS server (142).

In one or more embodiments, the NAS server (142) includes functionality for servicing requests issued by the universal connector (118). The NAS server (142) may service the requests by accessing or otherwise obtaining data from the NAS system (144). The NAS server (142) may further include functionality for storing data provided from the universal connector (112) as initiated by the applications (112). The NAS server (142) may service the requests, at least in part, in accordance with the methods of FIGS. 2-9.

Figure 11:
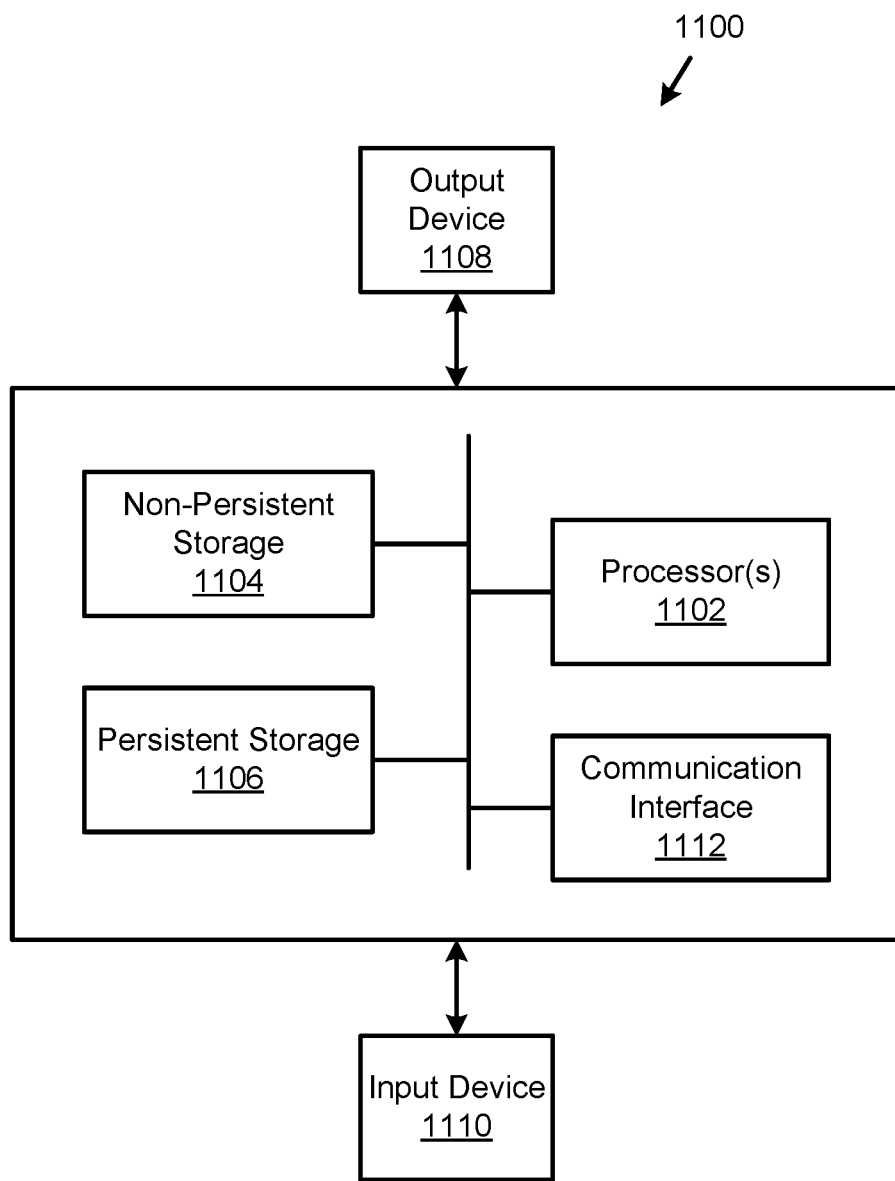
FIG. 11 shows a diagram of a computing device in accordance with one or more embodiments of the invention.

In one or more embodiments, the NAS server (142) is implemented as a computing device (see e.g., FIG. 11). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the NAS server (142) described throughout this application.

In one or more embodiments of the invention, the NAS server (142) is implemented as a logical device. The logical device may utilize the computing resources of any number of computing devices and thereby provide the functionality of the NAS server (142) described throughout this application.

In one or more embodiments of the invention, the NAS server (142) stores the data in a NAS system (144). The NAS system (144) may include any number of storage devices (144A, 144P). Each storage device (144A, 144P) includes functionality for storing application data, file data (e.g., data associated with a file system), and/or any other data without departing from the invention. The data stored in the NAS system (144) may be accessible via the NAS server (142).

In one or more embodiments, the backup storage system (140) includes functionality for storing backups. The backups may be generated and/or stored via the universal connector (118). The backup storage system (140) may store backups obtained from the universal connector (118). The backups may be generated in accordance with FIGS. 2-9.

FIGS. 2-9 show flowcharts in accordance with one or more embodiments of the invention. Each flowchart illustrated in FIGS. 2-9 describe a method for servicing a workload in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-9 may be performed in parallel with any other steps shown in FIGS. 2-9 without departing from the scope of the invention.

Figure 2:
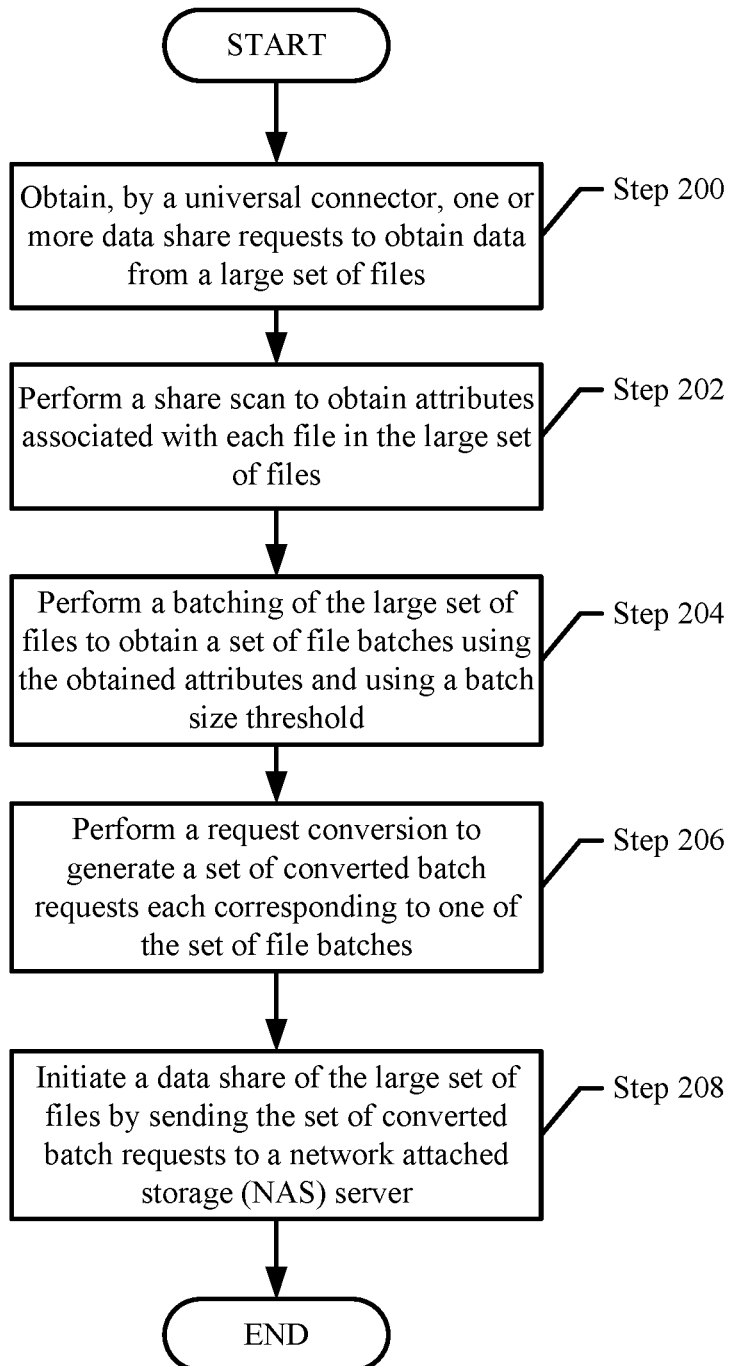
FIG. 2 shows a flowchart for optimizing a backup of a large set of files stored in a NAS system in accordance with one or more embodiments of the invention.

FIG. 2 shows a flowchart for optimizing a backup of a large set of files stored in a NAS system in accordance with one or more embodiments of the invention. The method shown in FIG. 2 may be performed by, for example, a universal connector (118, FIG. 1). Other components of the system illustrated in FIG. 1 may perform the method of FIG. 2 without departing from the invention.

Turning to FIG. 2, in step 200, one or more data share requests are obtained for data associated with a large set of files. In one or more embodiments, the data share requests each specify one or more files to be accessed by applications. The data share requests may be obtained from the application(s). In one or more embodiments, the data share requests may further include performing a backup of the large set of files. In one or more embodiments of the invention, the backups may be performed for each of the data share requests.

In step 202, a share scan is performed to obtain attributes associated with each file in the large set of files. In one or more embodiments, the share scan is a process for analyzing the metadata associated with the large set of files to generate an attributes table using the obtained attributes of the metadata. The attributes table may be stored as, for example, a SQLite table. The attributes table may specify, for example, a file identifier, a file name, a parent identifier, a file size, an access control list (ACL) associated with the NAS server, a timestamp, and an "other attributes" portion. The metadata may be obtained from the NAS server. Alternatively, the metadata may be previously stored by the universal connector.

In step 204, a batching of the large set of files is performed to obtain a set of file batches using the obtained attributes and using a batch size threshold. In one or more embodiments of the invention, the batching is a process for grouping the files based on the file sizes specified in the attributes table. The batch size threshold specifies a maximum combined size for each file batch. The batching includes minimizing the number of file batches without exceeding the batch size threshold for each file batch.

In step 206, a request conversion is performed to generate a set of converted batch requests each corresponding to one of the set of file batches. In one or more embodiments, the request conversion is a process for generating a batch request for each file batch. Each batch request is converted to a format that is readable to the NAS server to generate the converted batch requests. Each converted batch request specifies a process for accessing the data by the NAS server. The process may include opening the file from the NAS system, reading the file, and closing the file. The batch request may specify the opening, reading, and closing for each file in the respective file batch.

In step 208, a data share of the large set of files is initiated by sending the set of converted batch requests to a NAS server. In one or more embodiments, the data share includes sending the set of converted batch requests to the NAS server. The NAS server may, in turn, service the set of converted batch requests and send the resulting file data obtained from the NAS system to the universal connector.

In one or more embodiments, the universal connector may generate a backup of the large set of files using the obtained file data, and sending the generated backup(s) to the backup storage system for storage.

Figure 3:
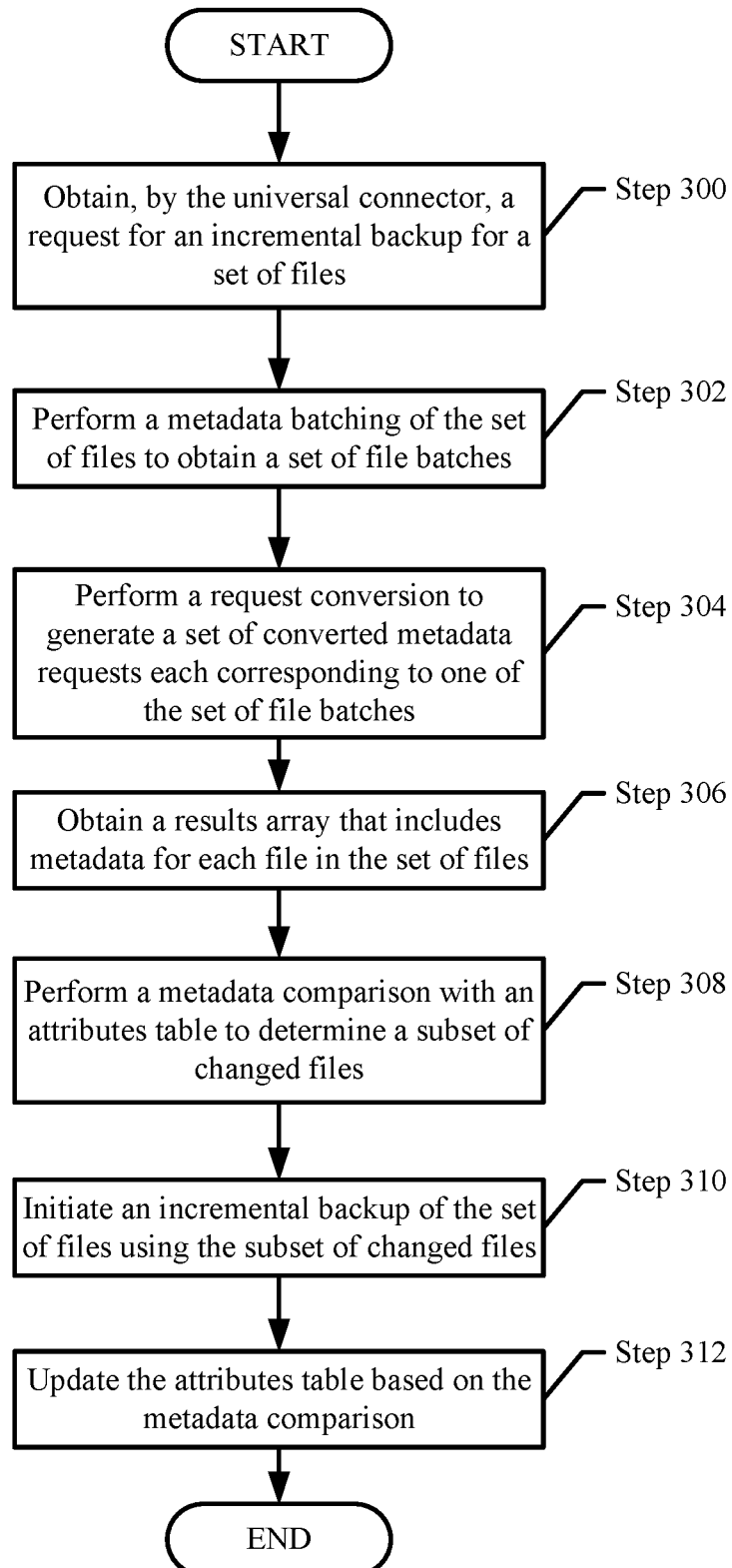
FIG. 3 shows a flowchart for optimizing incremental backups of network attached storage (NAS) file data in accordance with one or more embodiments of the invention.

FIG. 3 shows a flowchart for optimizing incremental backups of network attached storage (NAS) file data in accordance with one or more embodiments of the invention. The method shown in FIG. 3 may be performed by, for example, the universal connector (118, FIG. 1). Other components of the system illustrated in FIG. 1 may perform the method of FIG. 3 without departing from the invention.

Turning to FIG. 3, step 300, a request for an incremental backup for a set of files is obtained. In one or more embodiments, the request is obtained from an application. The request may specify only backing up a portion of the files that have changed since a previous backup. The previous backup may be a full backup (e.g., a backup that includes the data of all files in the set of files), or the previous backup may be another incremental backup.

In step 302, a metadata batching of the set of files is performed to obtain a set of file batches. In one or more embodiments of the invention, the metadata batching is a process for grouping the files in the set of files and generating the set of file batches each associated with a grouping of the files.

In step 304, a request conversion is performed to generate a set of converted metadata requests each corresponding to one of the set of file batches. In one or more embodiments, the request conversion is a process for generating a batch request for each file batch. Each metadata request is converted to a format that is readable to the NAS server to generate the converted batch requests. Each converted batch request specifies a process for accessing the data by the NAS server. The process may include a command for opening the directory of the corresponding files, a command for listing a set of attributes associated with the specified files, reading a list of specified attributes, and a command for closing the directory. The metadata request may specify the opening, listing, and closing for each file in the respective file batch. The set of metadata requests are sent to the NAS server.

In step 306, a results array is obtained from the NAS server. In one or more embodiments, the results array is obtained in response to the set of metadata requests. The results array may include the requested list of attributes associated with each file as specified in the set of metadata requests. The requested list of attributes may be referred to as the metadata.

In step 308, a metadata comparison is performed with an attributes table of the universal connector to determine a subset of changed files. In one or more embodiments, the metadata comparison includes performing a hash function on the obtained list of attributes to obtain a hash value for each file. The hash values are compared to stored hash values specified in the attributes table. Each file for which the generated hash value does not match the previously stored hash value is included in the subset of changed files.

In step 310, an incremental backup of the set of files is generated using the subset of changed files. In one or more embodiments, the incremental backup is generated by sending one or more data access requests to the NAS server to obtain the file data of the subset of changed files. The incremental backup is generated using the file data, and stored in the backup storage system.

In step 312, the attributes table is updated based on the metadata comparison. In one or more embodiments, the attributes table is updated by updating the list of attributes in the attributes table of the subset of changed files. Further, the hash values of the subset of changed files are updated in the attributes table.

Figure 4:
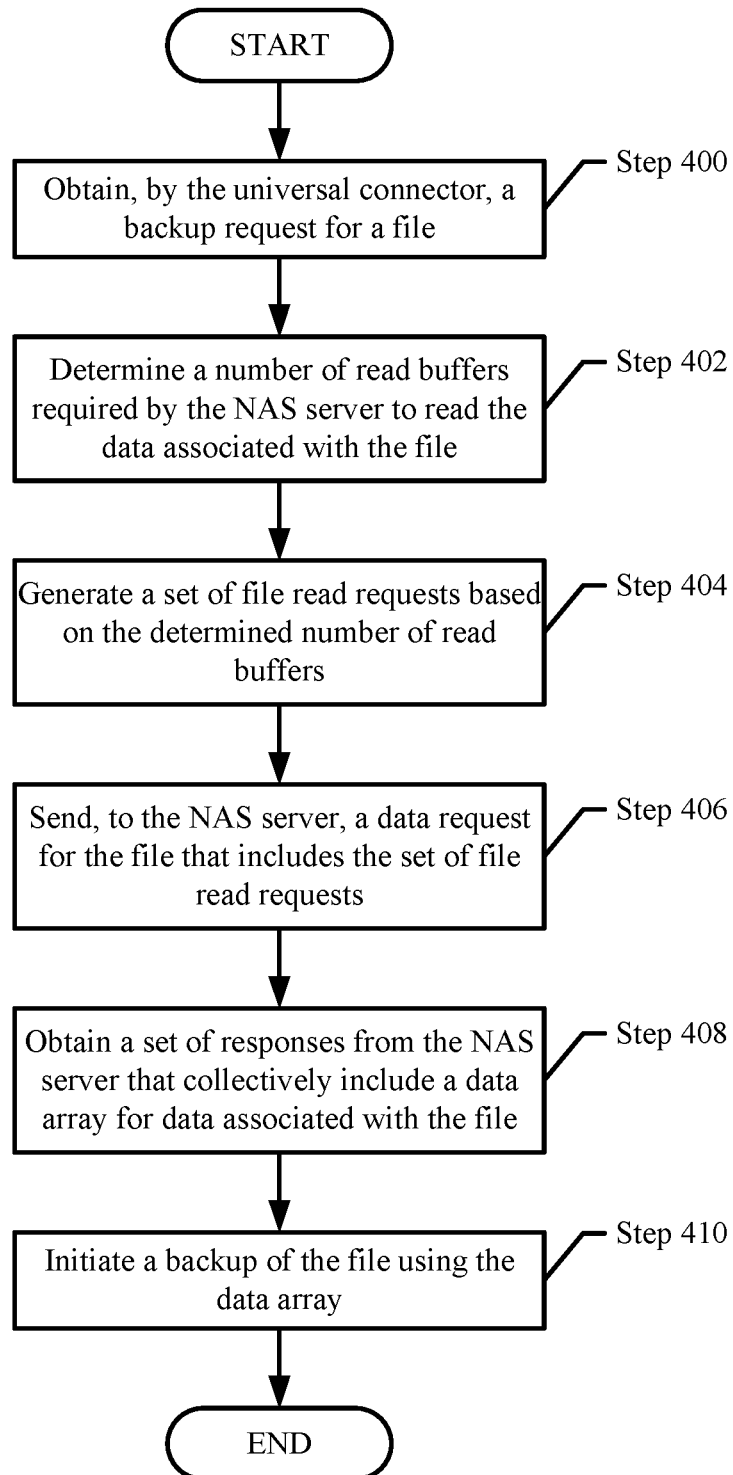
FIG. 4 shows a flowchart for managing network bandwidth for medium and large file sizes stored in a NAS system in accordance with one or more embodiments of the invention.

FIG. 4 shows a flowchart for managing network bandwidth for medium and large file sizes stored in a NAS system in accordance with one or more embodiments of the invention. The method shown in FIG. 4 may be performed by, for example, the universal connector (118, FIG. 1). Other components of the system illustrated in FIG. 1 may perform the method of FIG. 4 without departing from the invention.

Turning to FIG. 4, in step 400, a backup request for a file is obtained. In one or more embodiments of the invention, the backup request is obtained from an application. The backup request may specify backing up a file that is of a medium or large size. The large size may be, for example, more than one gigabyte (GB). The file data associated with the file may be stored, for example, in the NAS system.

In step 402, a number of read buffers (also referred to simply as buffers) required by the NAS server to read the data associated with the file is determined. In one or more embodiments, the number of read buffers are determined by communicating with the NAS server to obtain a configured buffer size for the NAS server.

The size of the buffers of the NAS limits the amount of data the NAS server may include in each response sent to the universal connector. As such, this may limit the amount of data that may be processed at a time based on the number of buffers generated by the universal connector. The number of buffers that may be generated by the universal connector may be limited to variables such as, for example, the network bandwidth, the size of each buffer, memory resources, and/or the cache resources of the universal connector. The obtained configured buffer size is used to calculate a number of buffers that can be generated by the universal connector to maximize the rate of data processed by the universal connector. For example, the universal connector may modify its buffer size to a size that matches the size of obtained buffer size of the NAS server. In this manner, each buffer is maximized by using all of its size per portion of data obtained by a response from the NAS server. This may maximize the use of the network bandwidth and the number of buffers used by the universal connector without sacrificing required buffer size.

Returning to the description of FIG. 4, in step 404, a set of file read requests are generated based on the determined number of read buffers. In one or more embodiments, the file read requests each specify at least a portion of the file data associated with the requested file.

In step 406, a data request is sent for the file that includes the file read requests. The data request may be sent to the NAS server.

In step 408, a set of data responses are obtained from the NAS server that includes a data array associated with the file. In one or more embodiments, the NAS server returns the set of responses as the data is processed (e.g., obtained from the NAS server and stored in a buffer of the NAS server). In this manner, the responses may be obtained in parallel or sequentially without departing from the invention. As the responses are obtained, which each include a portion of data, the corresponding portion of data is written to the data array.

In step 410, a backup of the file is initiated using the data array. In one or more embodiments, the backup is initiated by storing the data array, which includes the portions of data obtained from the NAS server that collectively comprise the file, in the backup storage system.

In one or more embodiments of the invention, the number of data buffers enables a number of files that may be backed up in accordance with FIG. 4 in parallel. In this manner, the efficiency of the network providing communication between the NAS server and the universal connector is maximized.

Figure 5:
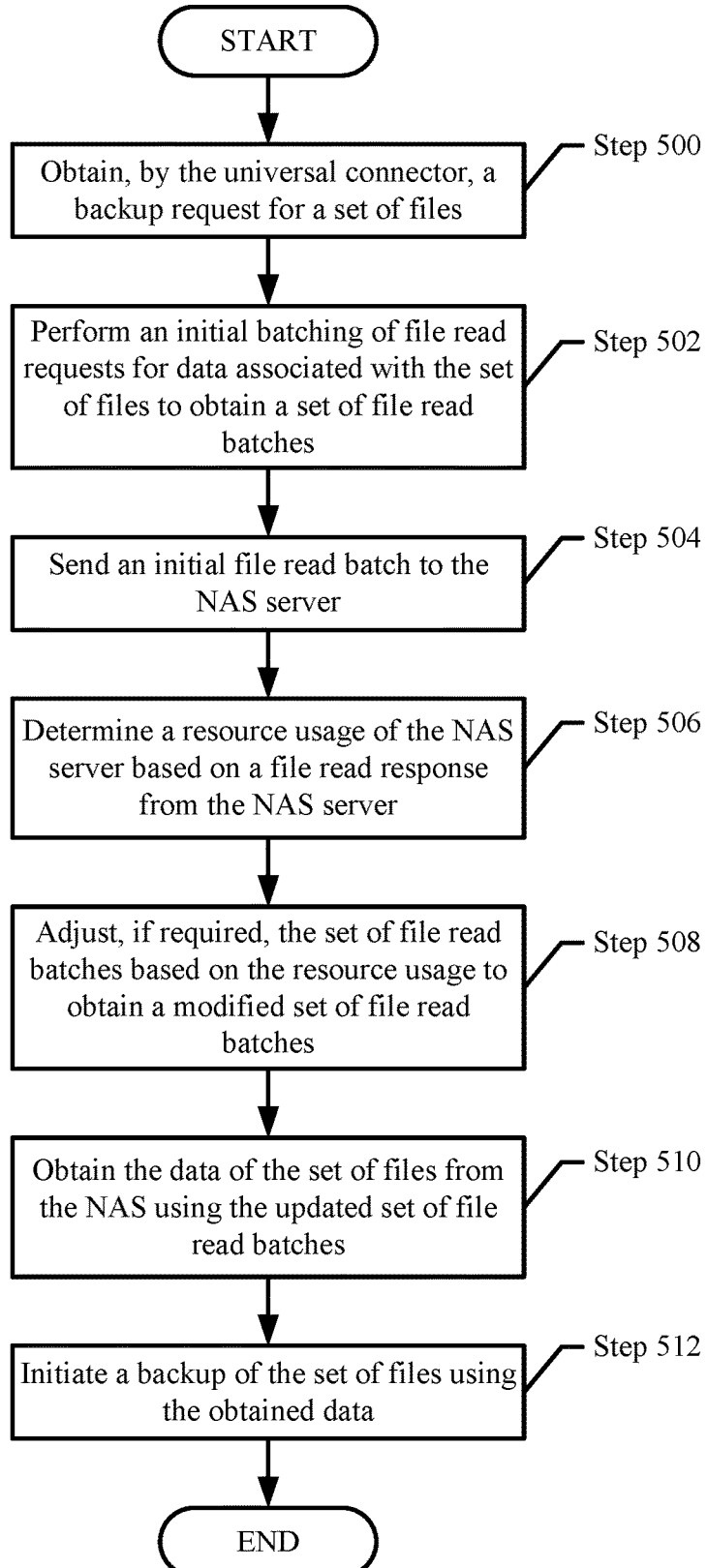
FIG. 5 shows a flowchart for optimizing NAS backups of a large set of files based on resource availability in accordance with one or more embodiments of the invention.

FIG. 5 shows a flowchart for optimizing NAS backups of a large set of files based on resource availability in accordance with one or more embodiments of the invention. The method shown in FIG. 5 may be performed by, for example, the universal connector (118, FIG. 1). Other components of the system illustrated in FIG. 1 may perform the method of FIG. 5 without departing from the invention.

Turning to FIG. 5, in step 500, a backup request is obtained for a set of files. In one or more embodiments of the invention, the backup request is obtained from an application. The backup request may specify backing up a large set of files. The file data associated with the large set of files may be stored, for example, in the NAS system.

In step 502, an initial batching of file read requests is performed for data associated with the set of files to obtain a set of file read batches. In one or more embodiments of the invention, the backup request is obtained from an application. The backup request may specify backing up the set of files. The file data associated with the set of files may be stored, for example, in the NAS system.

In step 504, an initial file read batch is sent to the NAS server. In one or more embodiments, the initial file read batch is a first grouping of the files based on a default configuration of the universal connector. The default configuration may specify an initial size of the file read batch. For example, the default configuration may be a predetermined number of files to be included and/or a total size of the files in the initial file read batch.

In step 506, a resource usage of the NAS server is determined based on a file read response from the NAS server. In one or more embodiments, the resource usage of the NAS server is determined by sending the initial file read batch to the NAS server. The initial file read batch specifies returning the data associated with the files of the initial file read batch.

In response to obtaining the file read batch, the NAS server may read as many files from the file read batch as it is capable based on its available resources. For example, the NAS server may not be fully capable to service the file read batch. The NAS server may only read a portion of the files specified in the file read batch. As such, only the portion of the files may be provided to the universal connector. The file read response obtained by the universal connector from the NAS server may include the portion of the files.

In one or more embodiments of the invention, the universal connector determines the resource usage of the NAS server by identifying the capability of the NAS server on a per-file read batch basis. For example, if the file read response includes the data of only 800 files instead of the 1000 files specified in the file read request, the resource usage is determined to be 200 files. The resource usage is used to adjust future file read batches (further discussed in step 508 below).

In step 508, the set of file read batches are adjusted based on the resource usage to obtain an updated set of file read batches. In one or more embodiments, the set of file read batches are adjusted by reducing, if required, the number of files (or the size of the data of the files) specified in the set of file read batches. In this manner, each file read batch specifies obtaining data from a fewer number than the previous set of file read batches. The universal connector may send the updated set of file read batches to the NAS server.

In step 510, the file data of the set of files from the NAS server are obtained using the updated set of file read batches.

In step 512, a backup of the set of files is initiated using the obtained data. The backup may be initiated by generating the backup using the obtained data and storing the backup in the backup storage system.

Figure 6:
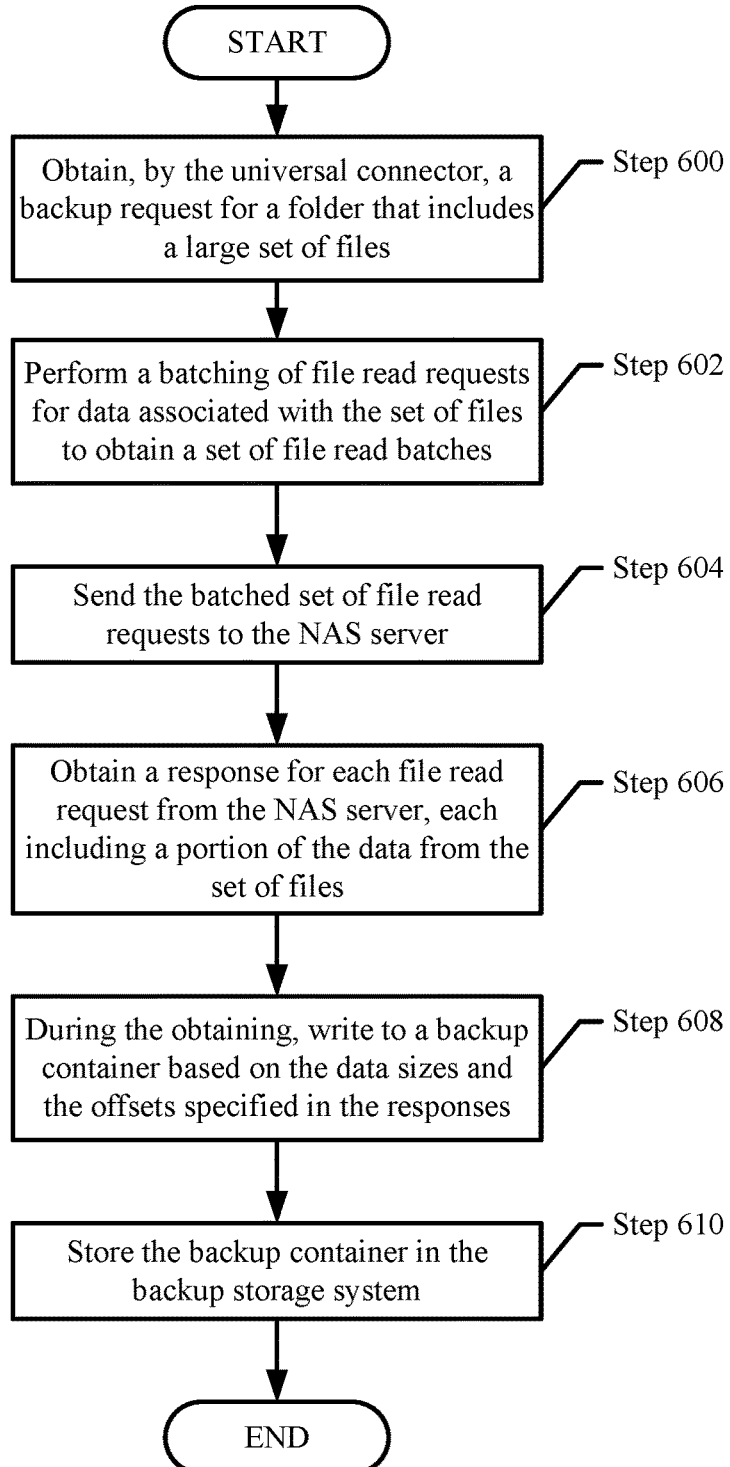
FIG. 6 shows a flowchart for parallelization of backups of a folder including a large set of files in accordance with one or more embodiments of the invention.

FIG. 6 shows a flowchart for parallelization of backups of a folder including a large set of files in accordance with one or more embodiments of the invention. The method shown in FIG. 6 may be performed by, for example, the universal connector (118, FIG. 1). Other components of the system illustrated in FIG. 1 may perform the method of FIG. 6 without departing from the invention.

Turning to FIG. 6, in step 600, a backup request for a folder that includes large set of files is obtained. In one or more embodiments of the invention, the backup request is obtained from an application. The backup request may specify backing up a folder that includes a large number of files. The large number of files in the folder may be, for example, multiple millions. The file data associated with the large set of files may be stored, for example, in the NAS system.

In step 602, a batching of file read requests is performed for data associated with the set of files to obtain a set of file read batches. In one or more embodiments, the folder is separated into groupings of files based on file sizes and/or by a number of files. Each file read batch may be assigned an offset and a batch size based on the total size of the files specified in each file read batch.

In step 604, the set of file read batches are sent to the NAS server. In one or more embodiments of the invention, each file read batch specifies a process for accessing the data by the NAS server. The process may include opening the files from the NAS system, reading the files, and closing the files. The batch request may specify the opening, reading, and closing for each file in the respective file read batch.

In step 606, a response for each file read batch is obtained from the NAS server. In one or more embodiments, each response includes the portion of the file data for the folder and the offset of the corresponding file read batch.

In step 608, a backup container is written to during the obtaining of the responses. In one or more embodiments, in parallel to obtaining the responses, the data obtained in the responses is written into a backup container. The offset is used to write to a predetermined storage location associated with the backup container. The storage location may be virtualized without departing from the invention. The parallelized process of obtaining the responses and storing the corresponding data in the backup container may be continued until all responses are obtained and all of the data associated with the folder is stored in the backup container.

In step 610, the backup container is stored in the backup storage system. In this manner, the backup container includes all of the data associated with the folder though the data was obtained from multiple responses from the NAS server.

Figure 7:
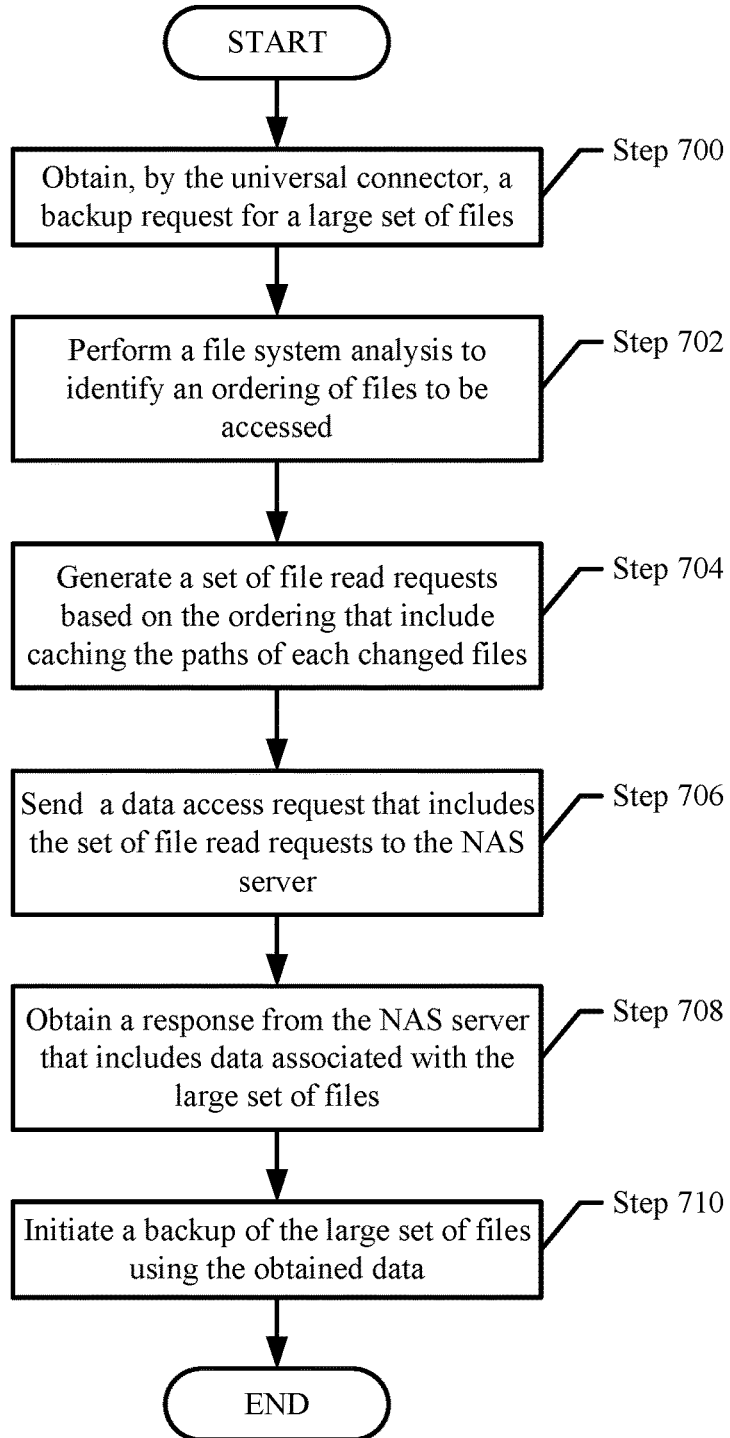
FIG. 7 shows a flowchart for managing a backup of a large set of files using a file system analysis for data stored in a NAS system in accordance with one or more embodiments of the invention.

FIG. 7 shows a flowchart for managing a backup of a large set of files using a file system analysis for data stored in a NAS system in accordance with one or more embodiments of the invention. The method shown in FIG. 7 may be performed by, for example, the universal connector (118, FIG. 1). Other components of the system illustrated in FIG. 1 may perform the method of FIG. 7 without departing from the invention.

Turning to FIG. 7, in step 700, a backup request is obtained for a large set of files. In one or more embodiments of the invention, the backup request is obtained from an application. The backup request may specify backing up a large set of files. The file data associated with the large set of files may be stored, for example, in the NAS system. In one or more embodiments, the backup may be for a file system that includes the data associated with the files.

In step 702, a file system analysis is performed on the large set of files to identify an ordering of files to be accessed. In one or more embodiments, the file system analysis includes identifying the parent folders of each of the files in the file system, identifying other files stored in the same folder (e.g., parent file), identifying any changes in the file dependencies between any files since a previous backup, and storing the changes, if any, in cache of the universal connector.

For example, consider a scenario in which a first file is backed up in a container, and the file is stored in a file path of: a/b/c/t.txt. Now consider that after the backup, the file is moved to the file path of: a/b/e/t.txt. The universal connector may store this change in cache such that, during a future backup operation, the cache may be used to read the file during the reading of other files in the file path a/b/c. The ordering may be otherwise based on the file paths of the files. For example, to reduce the number of times a first folder is opened in order to access the files in such folder, the ordering may include accessing the files in one folder sequentially before opening other files in other folders, and closing the folder after all files in the folder have been accessed (e.g., read by the NAS server for the purpose of servicing a file read request from a universal connector).

In step 704, a set of file read requests is generated based on the ordering. In one or more embodiments, the set of file read requests specify accessing at least a portion of the large set of files of the backup request. The large set of files may be based on the dependencies of the files and/or the file paths. For example, files in the same folders and/or subfolders may be grouped and specified in the same file read requests.

In step 706, a data access request is sent to the NAS server. In one or more embodiments of the invention, the data access request includes the set of file read requests generated in step 704. Further, the data access request orders the file read requests in a way that the NAS server reads and accesses the files in the ordering identified in step 702.

In step 708, a response is obtained from the NAS server that includes data associated with the large set of files. In one or more embodiments of the invention, the response includes the data from the large set of files obtained from the NAS server after the NAS server services the data access request in the specified order.

In step 710, a backup of the large set of files is initiated using the data obtained in step 708. In one or more embodiments of the invention, the backup includes writing the data into a backup container in the backup storage based on the specified ordering. The universal connector may further utilize the cached information that specifies the changed files (i.e., the files that have changed file locations since the previous backup), and write such changed files in the order of the previous file locations to the backup container stored in the backup storage system.

Figure 8:
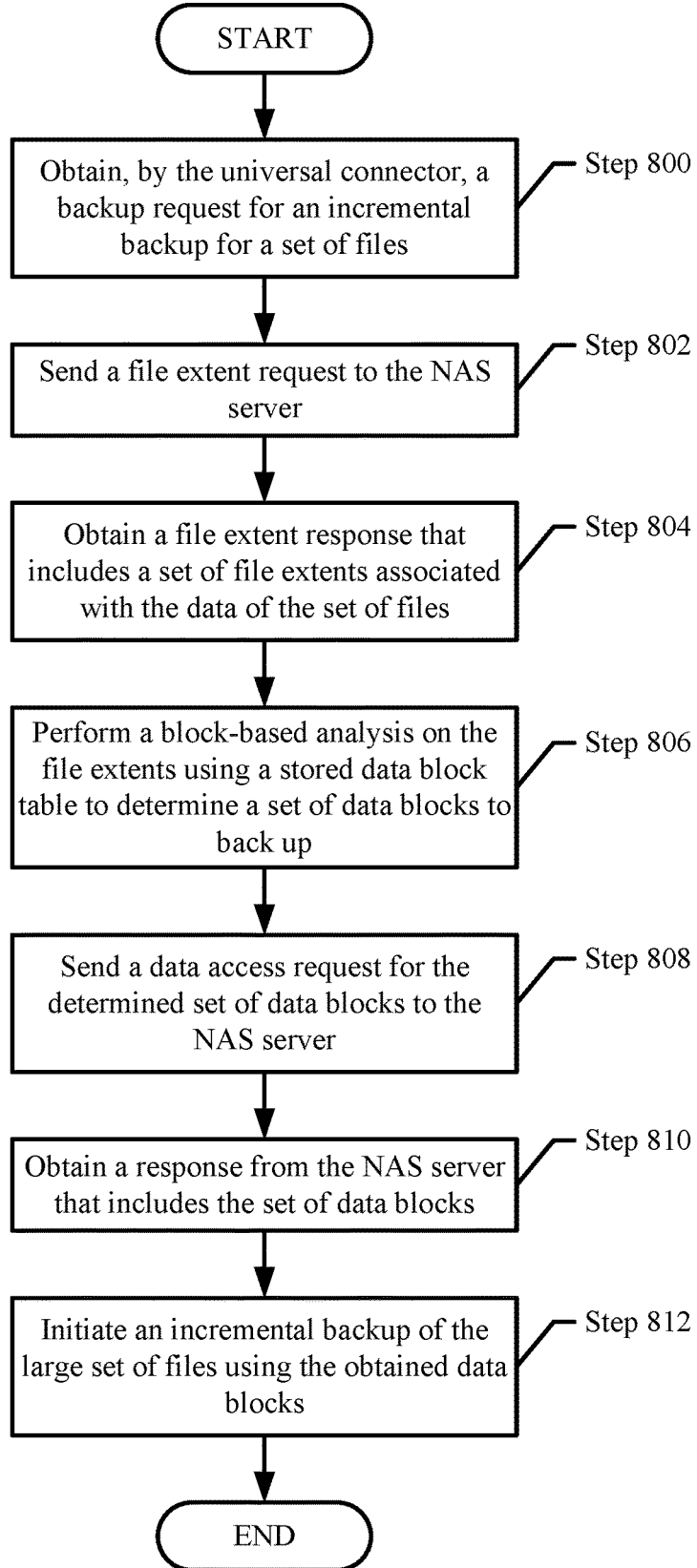
FIG. 8 shows a flowchart for generating incremental backups for file based backups stored in a NAS system in accordance with one or more embodiments of the invention.

FIG. 8 shows a flowchart for generating incremental backups for file based backups stored in a NAS system in accordance with one or more embodiments of the invention. The method shown in FIG. 8 may be performed by, for example, the universal connector (118, FIG. 1). Other components of the system illustrated in FIG. 1 may perform the method of FIG. 8 without departing from the invention.

Turning to FIG. 8, in step 800, a backup request for an incremental backup of a set of files is obtained. In one or more embodiments, the backup request is obtained from an application. The request may specify only backing up a portion of data associated with the files that have changed since a previous backup. The previous backup may be a full backup (e.g., a backup that includes the data of all files in the set of files), or the previous backup may be another incremental backup. The backup request of FIG. 8 specifies performing a block-based backup. In one or more embodiments, the block-based backup is a type of backup that stores the changed data blocks of a data set (e.g., a set of files). In contrast, a file based backup may store the changed files of a set of files. An example of a file based backup may be found in FIG. 3.

In step 802, a file extent request is sent to the NAS server. In one or more embodiments of the invention, the file extent request specifies obtaining a set of file extents. The file extents may each be a data structure that specifies a portion of data (e.g., one or more data blocks), an offset of the data blocks, and a range associated with a contiguous portion of the data. Each file extent may further include a checksum of the corresponding data. In this manner, if the data is changed, the checksum may be regenerated to produce a different checksum. The file extent request may specify obtaining the set of all file extents associated with the set of files.

In step 804, a file extent response is obtained that includes a set of file extents associated with the data of the set of files. In one or more embodiments, the NAS server may access the NAS system to obtain the requested set of file extents and provide the set of file extents to the universal connector.

In step 806, a block-based analysis is performed on the file extents using a stored data block table to determine a set of data blocks to back up. In one or more embodiments, the block-based analysis includes comparing the obtained checksums of the set of file extents to previously stored checksums of the file extents stored in the data block table. For any file extents that have non-matching checksums, the corresponding data blocks are tracked by the universal connectors. The block-based analysis may be performed for each file extent in the set of file extents.

In step 808, a data access request for the determined set of data blocks is sent to the NAS server. The data access request may specify the data blocks that were tracked by the universal connector during the block-based analysis of step 806.

In step 810, a response is obtained from the NAS server that includes the set of data blocks. In one or more embodiments, the NAS server accesses the data specified in the data access request and sends the requested data to the universal connector.

In step 812, an incremental backup of the large set of files is initiated using the obtained data blocks. The incremental backup includes storing the obtained data, which includes the data from the changed data blocks, in a backup and storing the backup in the backup storage system.

Figure 9:
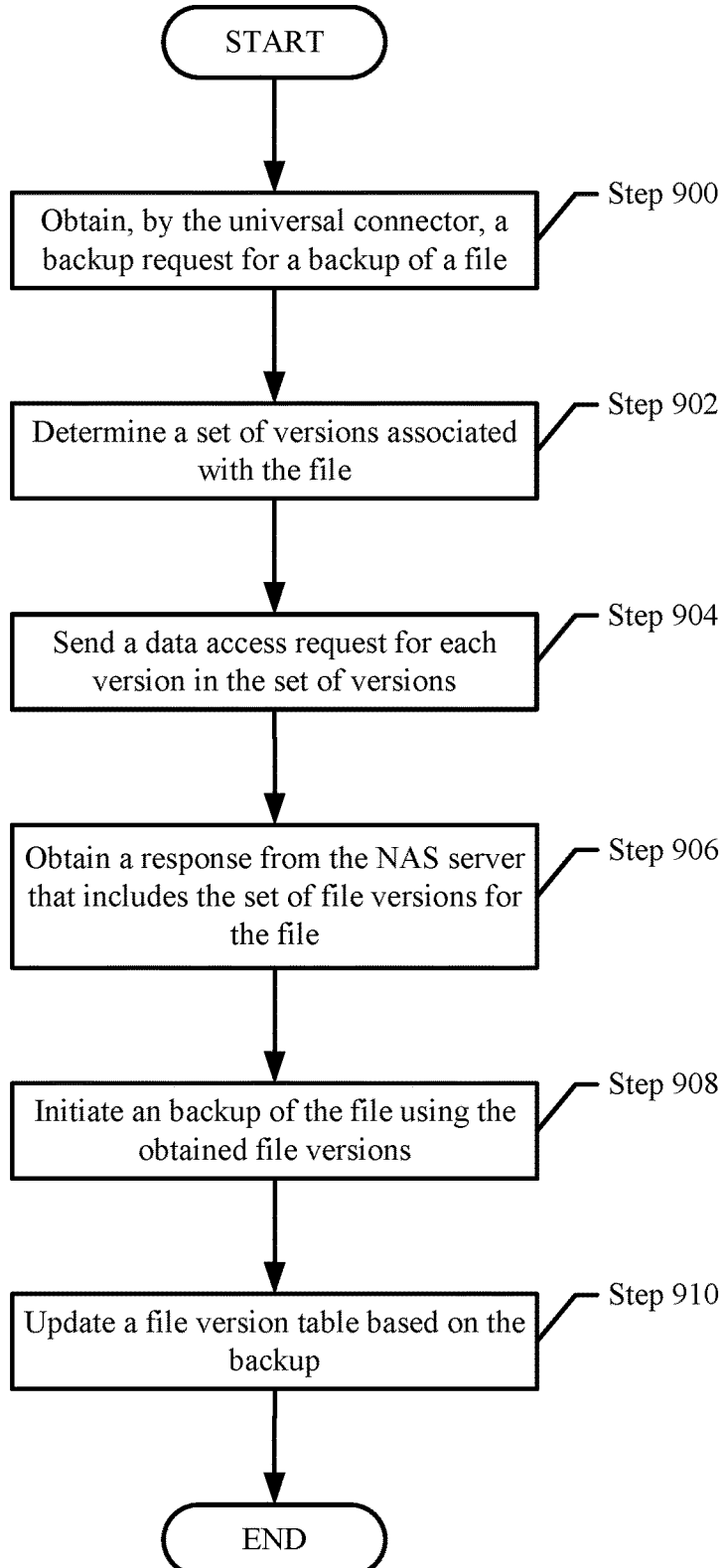
FIG. 9 shows a flowchart for performing backups of multiple versions of a file stored in a NAS system in accordance with one or more embodiments of the invention.

FIG. 9 shows a flowchart for performing backups of multiple versions of a file stored in a NAS system in accordance with one or more embodiments of the invention. The method shown in FIG. 9 may be performed by, for example, the universal connector (118, FIG. 1). Other components of the system illustrated in FIG. 1 may perform the method of FIG. 9 without departing from the invention.

Turning to FIG. 9, in step 900, a backup request for a backup of a file is obtained. In one or more embodiments of the invention, the backup request is obtained from an application. The backup request may specify backing up the file. The file data associated with the file may be stored, for example, in the NAS system.

In step 902, a set of versions associated with the file is identified. In one or more embodiments, the set of versions are stored by the universal connector. The universal connector may track each version (e.g., using a file version table) of each backup stored in the backup storage system. Further, the universal connector may specify each version of the file stored in the NAS system. In one or more embodiments, the backup request further specifies the file versions to be backed up. In such embodiments in which the backup request does not specify the requested files, the universal connector may implement a default policy for identifying the set of versions to be backed up. The default policy may specify, for example, backing up all versions of the file.

In one or more embodiments, the backup request specifies a time period for which the files to be generated. The file versions may be identified using the timestamps of the files as specified in the file version table. The file versions that specify a time stamp that is within the requested backup request are included in the requested time period.

In step 904, a data access request is sent for each version in the set of versions. In one or more embodiments, the data access request may specify obtaining each of the file versions in the set from the NAS system.

In step 906, a response is obtained from the NAS server that includes the set of file versions for the file. In one or more embodiments, the NAS server accesses the data specified in the data access request and sends the requested data to the universal connector.

In step 908, a backup of the file is initiated using the obtained file versions. In one or more embodiments, initiating the backup includes storing the obtained data, which includes the data from the set of file versions, in a backup and storing the backup in the backup storage system. In one or more embodiments, a backup is generated and stored for each file version in the set of files.

In step 910, the file version table is updated based on the backup. In one or more embodiments, the file version table is updated to specify any new file versions that are generated and/or stored in the NAS system following the backup initiated in step 908.

The following sections each include an independent example that illustrate the systems and methods in accordance with one or more embodiments of the invention. Examples 1-8 are intended to be independent from each other.

Example 1

Figure 10A:
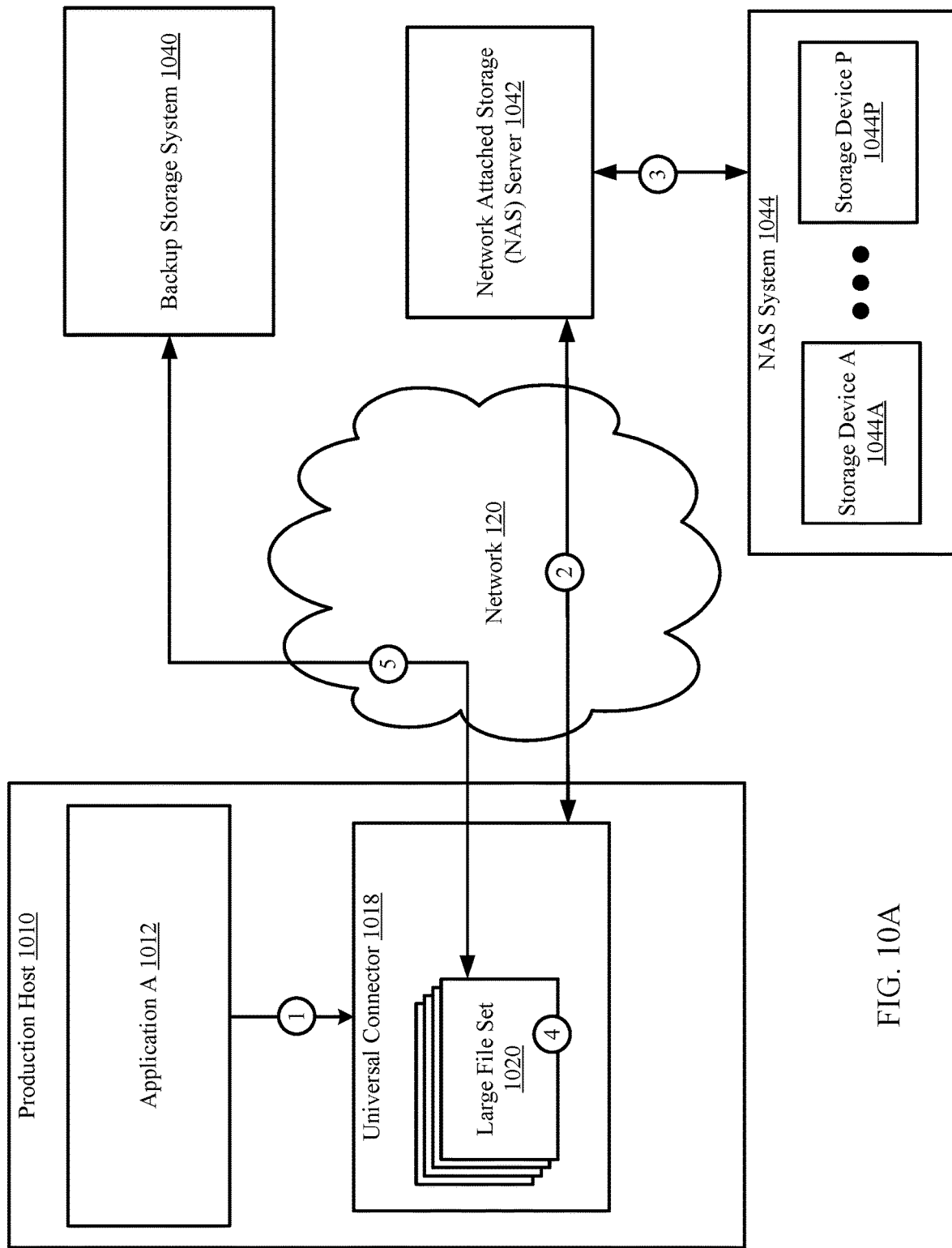
FIGS. 10A-10H each show an example in accordance with one or more embodiments of the invention.

The following section describes an example. The example, illustrated in FIG. 10A, is not intended to limit the invention and is independent from any other examples discussed in this application. Turning to the example, consider a scenario in which an application utilizes a universal connector to obtain a large set of files associated with a million files from a network attached storage (NAS) system.

Turning to the example, FIG. 10A shows a diagram of an example system. For the sake of brevity, not all components of the example system may be illustrated in FIG. 10A. The example system may include a production host (1010), a backup storage system (1040), a NAS server (1042), and a NAS system (1044). The production host (1010) includes application A (1012) and a universal connector (1018). The universal connector (1018) is operatively connected to the NAS server (1042) via a network (120). The NAS server (1042) is operatively connected to the NAS system (1044). The NAS system (1044) may include any number of storage devices (1044A, 1044P).

Application A (1012) may send multiple data share requests to the universal connector (1018) that collectively specify obtaining and backing up a large set of files [1]. The large set of files may include over one million files, each file ranging in size between 1 kilobytes (KB) and 16 KB. The data share requests may be sent in a virtual file system (VFS) protocol. The universal connector (1018), in response to obtaining the set of data share requests, performs the method of FIG. 2 to process the multiple data share requests. Specifically, the universal connector (1018) obtains the attributes associated with the large set of files and performs a batching to generate a set of file batches based on the sizes of the files, as specified in the obtained attributes, and based on a batch size threshold. In this example, the batch threshold value is 256 KB. As such, the number of files may range based on the sizes of the files.

As discussed in FIG. 2, the universal connector (1018) may perform a request conversion to generate a set of converted batch requests that are in a network file system (NFS) protocol, as that is the protocol readable to the NAS server (1042). The universal connector (1018) sends the set of converted batch requests to the NAS server (1042) [2]. The NAS server (1042), in response to the set of converted batch requests, services each of the set of converted batch requests by accessing the requested files in each converted batch request from the NAS system (1044) [3]. After servicing each converted batch request, the corresponding file data is provided to the universal connector (1018). The universal connector (1018) obtains the file data from the NAS server (1042). Collectively, the obtained file data is the large set of files (1020) [4]. Continuing the servicing of the data share request, the universal connector (1018), after obtaining the large set of files (1020), generates a backup of the large set of files (1020) and stores the backup in the backup storage system (1040) [5].

End of Example 1

Example 2

Figure 10B:
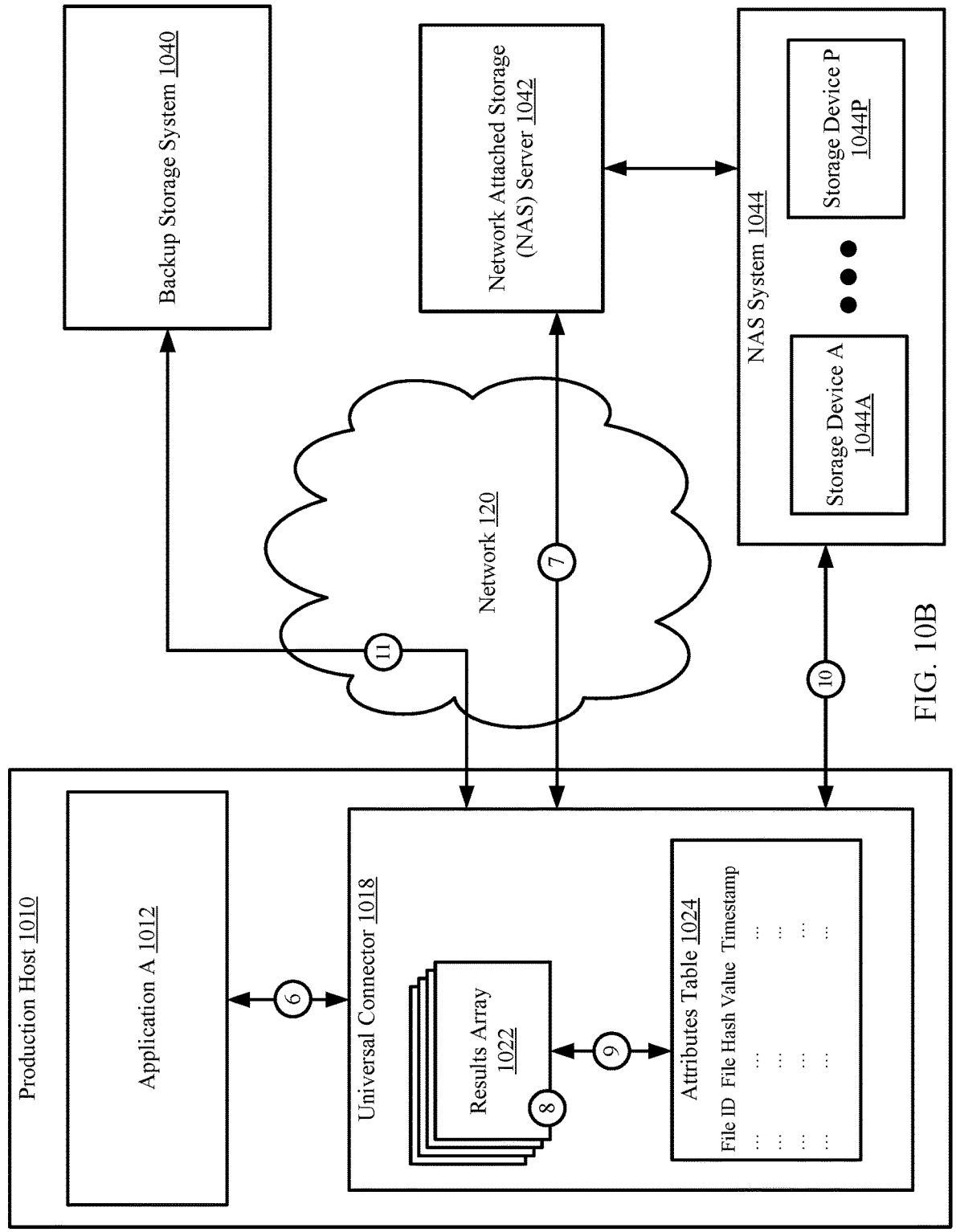

The following section describes an example. The example, illustrated in FIG. 10B, is not intended to limit the invention and is independent from any other examples discussed in this application. Turning to the example, consider a scenario in which an application utilizes a universal connector to obtain metadata for a large set of files associated with a million files from a network attached storage (NAS) system.

Turning to the example, FIG. 10B shows a diagram of an example system. For the sake of brevity, not all components of the example system may be illustrated in FIG. 10B. The example system may include a production host (1010), a backup storage system (1040), a NAS server (1042), and a NAS system (1044). The production host (1010) includes application A (1012) and a universal connector (1018). The universal connector (1018) is operatively connected to the NAS server (1042) via a network (120). The NAS server (1042) is operatively connected to the NAS system (1044). The NAS system (1044) may include any number of storage devices (1044A, 1044P).

Application A (1012) may send an incremental backup request to the universal connector (1018) that specifies performing an incremental backup of a large set of files [6]. The large set of files may include over one million files, each file ranging in size between 1 kilobytes (KB) and 16 KB. The incremental backup request may be sent in a virtual file system (VFS) protocol. The universal connector (1018), in response to obtaining the incremental backup request, performs the method of FIG. 3 to process the incremental backup request. Specifically, the universal connector (1018) performs a metadata batching on the large set of files to obtain a set of file batches. The set of file batches may be performed based on a number of files per file batch. In this example, each file batch is associated with 1,000 files. The universal connector (1018) sends metadata batch requests each associated with a file batch in the set of file batches [7].

The NAS server (1042), in response to the set of converted batch requests, services each of the set of metadata requests by accessing the metadata stored in the NAS system (1044). After servicing each converted batch request, the corresponding metadata is provided to the universal connector (1018). The universal connector (1018) obtains the metadata from the NAS server (1042). Collectively, the obtained file data is a results array (1022) [8]. The results array includes a set of attributes associated with each file in the large set of files. Continuing the servicing of the incremental backup request, the universal connector (1018), after obtaining the results array (1022), compares the obtained results array (1022) to an attributes table (1024) already stored in the production host (1010) [9]. The comparison (i.e., the metadata comparison as referenced in FIG. 3) includes generating a hash values on the list of attributes of each file and compared to each hash value stored in the attributes table (1024) and determined whether the hash values match. The subset of files are determined where each hash value of the obtained attributes do not match to the corresponding hash value of the attributes table (1024).

After determining the subset of files, the file data associated with the subset of files is obtained from the NAS system (1044) [10]. While not illustrated in FIG. 10B, the file data is obtained by generating a data access request that specifies obtaining the determined file data and sending the data access request to the NAS server (1042). The NAS server (1042), in response to the data access request, accesses the requested files from the NAS system (1044). The corresponding file data is provided to the universal connector (1018). The universal connector (1018) obtains the file data from the NAS server (1042). Continuing the servicing of the incremental backup request, the universal connector (1018), after obtaining the file data of the subset of files, generates the incremental backup of the large set of files and stores the incremental backup in the backup storage system (1040) [11].

End of Example 2

Example 3

Figure 10C:
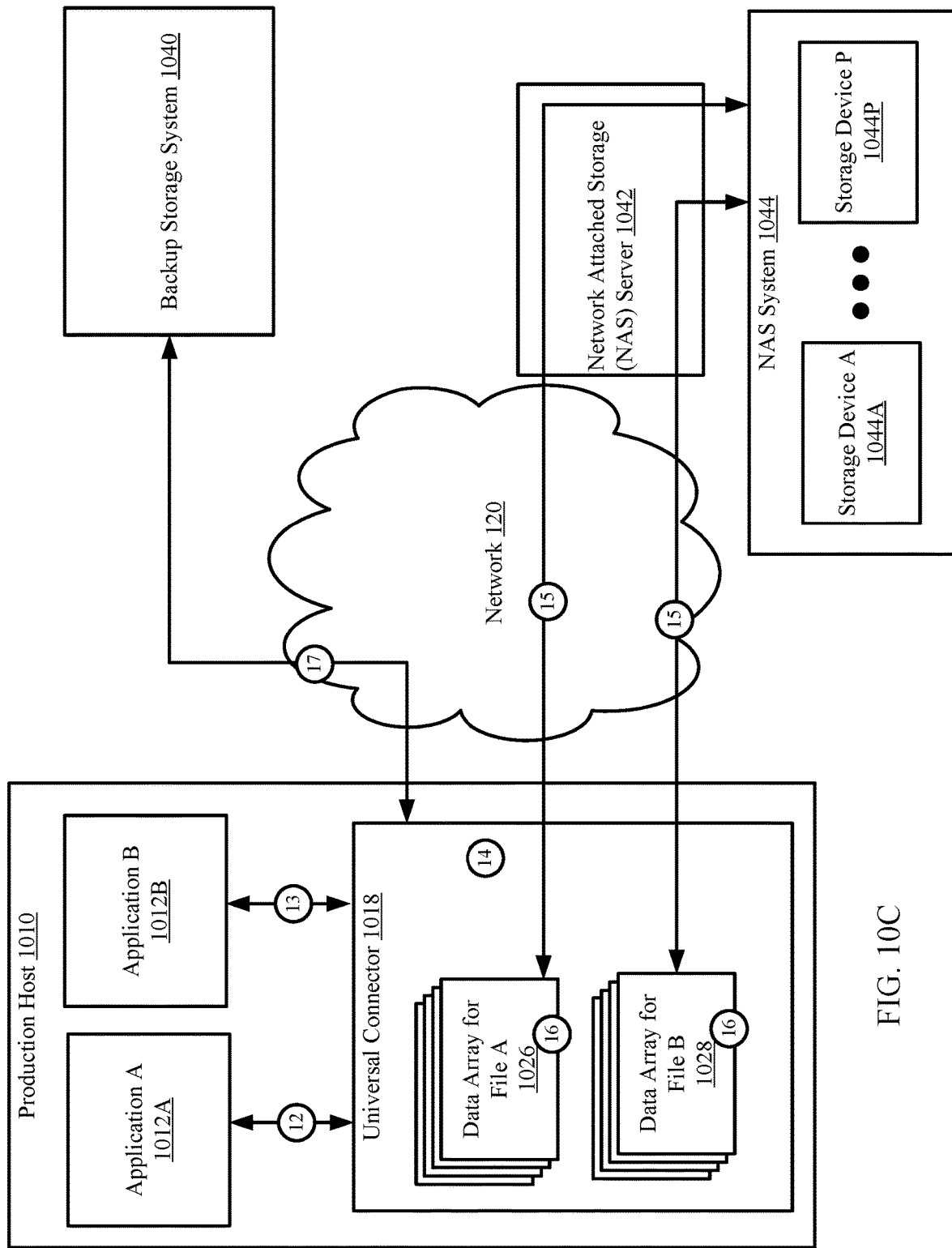

The following section describes an example. The example, illustrated in FIG. 10C, is not intended to limit the invention and is independent from any other examples discussed in this application. Turning to the example, consider a scenario in which two applications utilize a universal connector to generate parallel backups of two files.

Turning to the example, FIG. 10C shows a diagram of an example system. For the sake of brevity, not all components of the example system may be illustrated in FIG. 10C. The example system may include a production host (1010), a backup storage system (1040), a NAS server (1042), and a NAS system (1044). The production host (1010) includes application A (1012) and a universal connector (1018). The universal connector (1018) is operatively connected to the NAS server (1042) via a network (120). The NAS server (1042) is operatively connected to the NAS system (1044). The NAS system (1044) may include any number of storage devices (1044A, 1044P).

Application A (1012A) sends a backup request to the universal connector (1018) that specifies performing an incremental backup of a file of 10 GB in size [12], and application B (1012B) sends a backup request to the universal connector (1018) that specifies performing an incremental backup of a file of 15 GB in size [13]. The backup request may be sent in a virtual file system (VFS) protocol. The universal connector (1018), in response to obtaining the backup request, performs the method of FIG. 4 to process the backup request. Specifically, the universal connector (1018) determines the buffer size of the NAS server (1042) [14]. In this example, the buffer size may be stored in memory. Using the obtained buffer size, the universal connector (1018) modifies its own read buffers to be of a size identical to the NAS server (1042).

The universal connector (1018), in turn, provides a read buffer for each of the two files. The universal connector (1018) sends a set of file read requests for each of two files. Each file read request specifies a portion of the respective file, where each portion is of a size identical to the buffer size. The NAS server (1042) services each file read request in sequence and provides the resulting data to the universal connector (1018) [15]. As the data is obtained by the universal connector (1018), the universal connector populates a data array for file A (1026) and a data array for file B (1028) [16]. As a result of having two data buffers, each serving one of the two files, both data arrays (1026, 1028) are capable of being populated in parallel.

Once the data arrays (1026, 1028) are populated, the resulting backups are stored in the backup storage system (1040) [17].

End of Example 3

Example 4

Figure 10D:
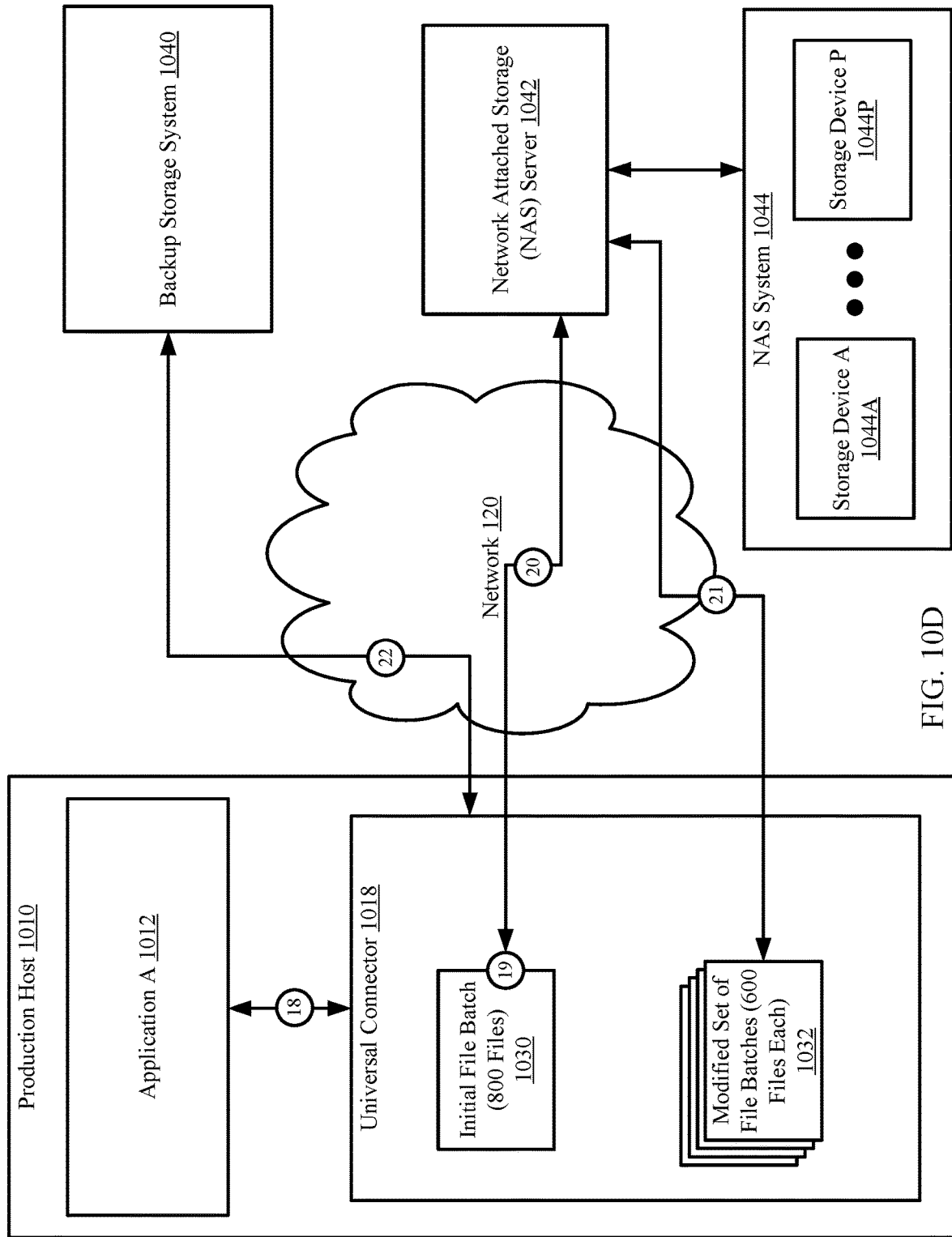

The following section describes an example. The example, illustrated in FIG. 10D, is not intended to limit the invention and is independent from any other examples discussed in this application. Turning to the example, consider a scenario in which two applications utilize a universal connector to generate a backup of a set of files that include one million files.

Turning to the example, FIG. 10D shows a diagram of an example system. For the sake of brevity, not all components of the example system may be illustrated in FIG. 10D. The example system may include a production host (1010), a backup storage system (1040), a NAS server (1042), and a NAS system (1044). The production host (1010) includes application A (1012) and a universal connector (1018). The universal connector (1018) is operatively connected to the NAS server (1042) via a network (120). The NAS server (1042) is operatively connected to the NAS system (1044). The NAS system (1044) may include any number of storage devices (1044A, 1044P).

Application A (1012) may send a backup request to the universal connector (1018) that specifies performing a backup of a set of files [18]. The backup request may be sent in a virtual file system (VFS) protocol. The universal connector (1018), in response to obtaining the backup request, performs the method of FIG. to process the backup request. Specifically, the universal connector (1018) generates an initial file batch (1030). The initial file batch (1030) specifies returning 800 files [19]. The initial file batch (1030) is sent to the NAS server (1042). The NAS server (1042), in response to obtaining the initial file batch (1030), accesses the NAS system (1044) to read the requested files. Due to the limited resource availability of the NAS server (1042), it is only able to process 600 files of the 800 files that are requested. As such, the NAS server (1042) returns a file read response that includes the data of 600 files and an error message that specifies an inability to provide the remaining 200 files.

Based on the file read response, the universal connector (1018) adjusts the number of files per file batch from 800 files to 600 files, and generates a modified set of file batches (1032) that each specify providing the data for 600 files of the remaining files to be provided [20]. The modified set of file batches (1032) may be provided to the NAS server (1042). The NAS server (1042), in response to obtaining the modified set of file batches (1032), accesses the NAS system (1044) to read the requested data, on a per-file batch basis, and return the requested data to the universal connector (1018) [21].

Once the data for all one million files are obtained from the NAS server (1042), a backup is generated using the requested data. The resulting backup is stored in the backup storage system (1040) [22].

End of Example 4

Example 5

Figure 10E:
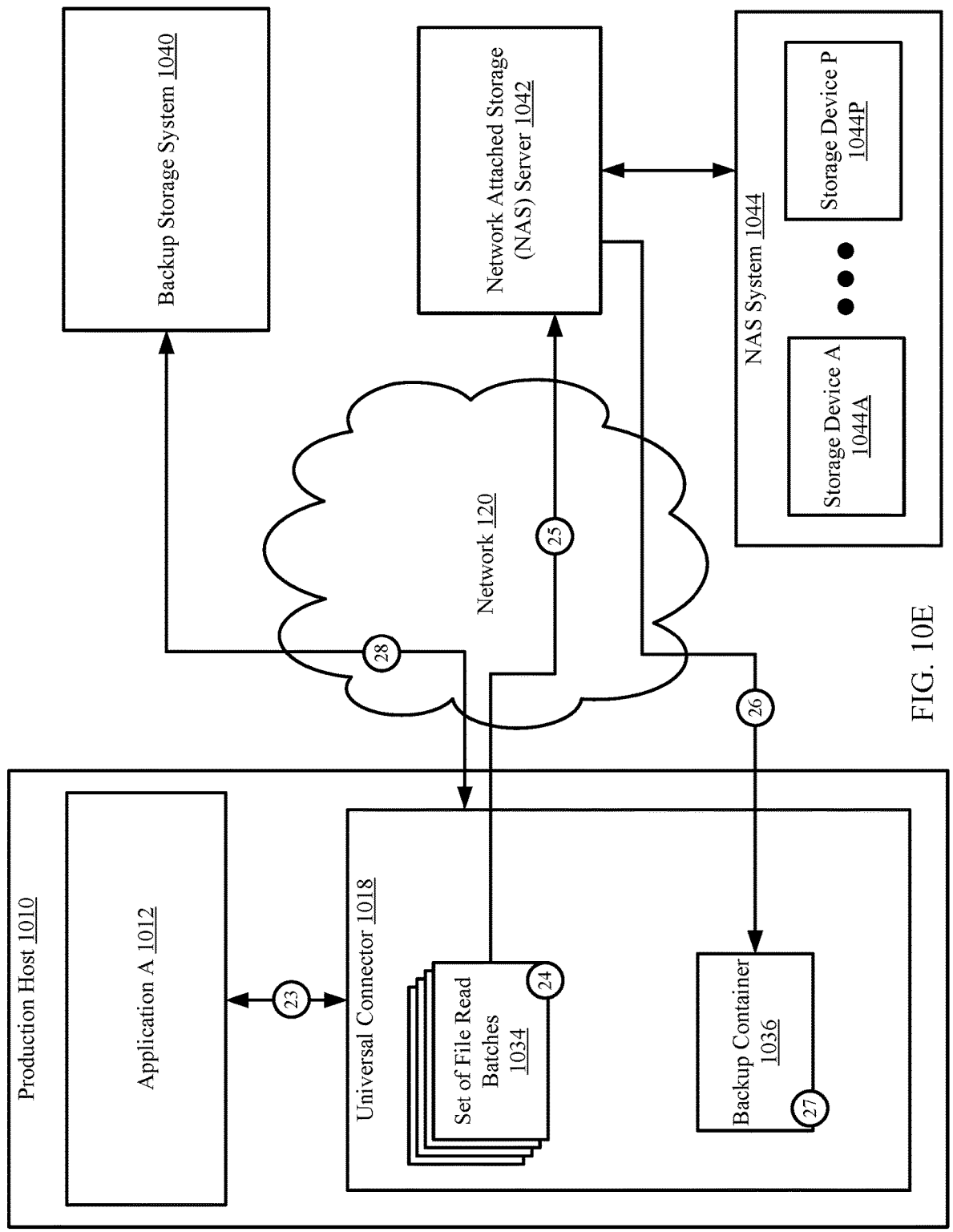

The following section describes an example. The example, illustrated in FIG. 10E, is not intended to limit the invention and is independent from any other examples discussed in this application. Turning to the example, consider a scenario in which two applications utilize a universal connector to generate a backup of a folder that includes ten million files.

Turning to the example, FIG. 10E shows a diagram of an example system. For the sake of brevity, not all components of the example system may be illustrated in FIG. 10E. The example system may include a production host (1010), a backup storage system (1040), a NAS server (1042), and a NAS system (1044). The production host (1010) includes application A (1012) and a universal connector (1018). The universal connector (1018) is operatively connected to the NAS server (1042) via a network (120). The NAS server (1042) is operatively connected to the NAS system (1044). The NAS system (1044) may include any number of storage devices (1044A, 1044P).

Application A (1012) may send a backup request to the universal connector (1018) that specifies performing a backup of a folder that includes ten million files [23]. The backup request may be sent in a virtual file system (VFS) protocol. The universal connector (1018), in response to obtaining the backup request, performs the method of FIG. 6 to process the backup request. Specifically, the universal connector (1018) generates a set of file read batches (1034) based on a grouping of the files in the folder. Each of the file read batches (1034) specify returning 500 files [24]. The set of file read batches (1034) is sent to the NAS server (1042) [25].

The NAS server (1042), in response to obtaining the set of file read batches (1034), accesses the NAS system (1044) to read the requested files. The NAS server (1042) may generate a response for each of the file read batches and provides the corresponding data for each file read batch to the universal connector (1018) [26].

During the processing of the file read batches by the NAS server (1042), the universal connector (1018) populates a backup container (1036) with the obtained data using an offset included in the file read batches [27]. The files may be stored in parallel, in contrast from other implementations that include waiting for the data for the entire folder to be provided to the universal connector (1018). Once the data for all ten million files are obtained from the NAS server (1042), the backup container (1036) is stored in the backup storage system (1040) [28].

End of Example 5

Example 6

Figure 10F:
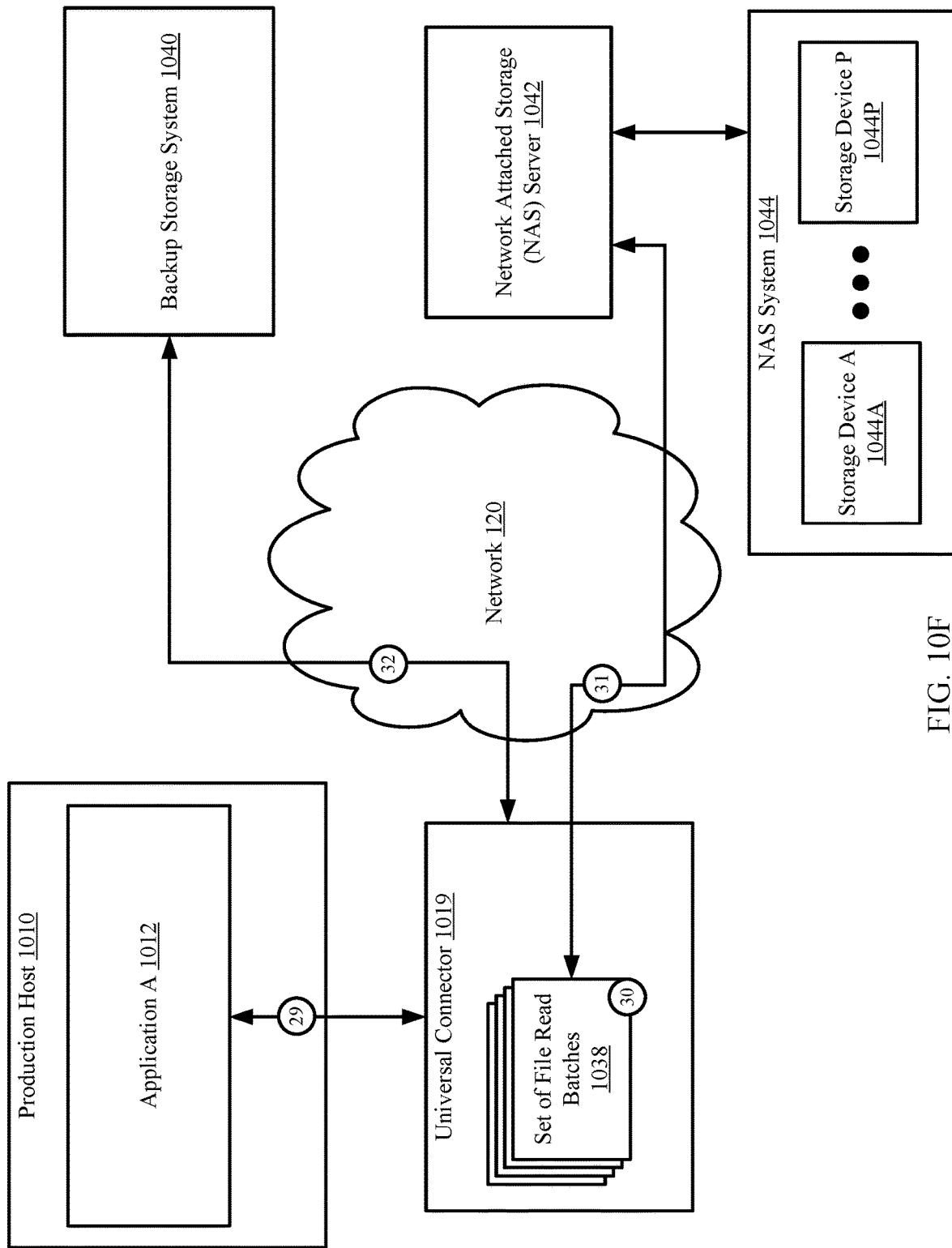

The following section describes an example. The example, illustrated in FIG. 10F, is not intended to limit the invention and is independent from any other examples discussed in this application. Turning to the example, consider a scenario in which two applications utilize a universal connector to generate a backup of a folder that includes ten million files.

Turning to the example, FIG. 10F shows a diagram of an example system. For the sake of brevity, not all components of the example system may be illustrated in FIG. 10F. The example system may include a production host (1010), a backup storage system (1040), a NAS server (1042), a universal connector (1019) and a NAS system (1044). The production host (1010) includes application A (1012). The universal connector (1019) is operatively connected to the NAS server (1042) via a network (120). The NAS server (1042) is operatively connected to the NAS system (1044). The NAS system (1044) may include any number of storage devices (1044A, 1044P).

Application A (1012) may send a backup request to the universal connector (1018) that specifies performing a backup of a file system that includes ten million files [29]. The backup request may be sent in a virtual file system (VFS) protocol. The universal connector (1019), in response to obtaining the backup request, performs the method of FIG. 7 to process the backup request. Specifically, the universal connector (1018) generates a set of file read batches (1038) based on a grouping of the files in the folder and based on an ordering of the files as determined using the method of FIG. 7. Further, the universal connector (1019) identifies a set of files that have been moved since the previous backup. The new locations of the identified set of changed files are stored in cache of the universal connector (1019). Each of the file read batches (1038) specify returning 500 files [30]. The set of file read batches (1038) is sent to the NAS server (1042).

The NAS server (1042), in response to obtaining the set of file read batches (1034), accesses the NAS system (1044) to read the requested files. The NAS server (1042) may generate a response for each of the file read batches and provides the corresponding data for each file read batch to the universal connector (1019) [31].

During the processing of the file read batches by the NAS server (1042), the universal connector (1019) populates a backup container (not shown) with the obtained data using an offset included in the file read batches. The files may be stored in the determined ordering. The backup container may be stored in the backup storage system (1040) [32].

End of Example 6

Example 7

Figure 10G:
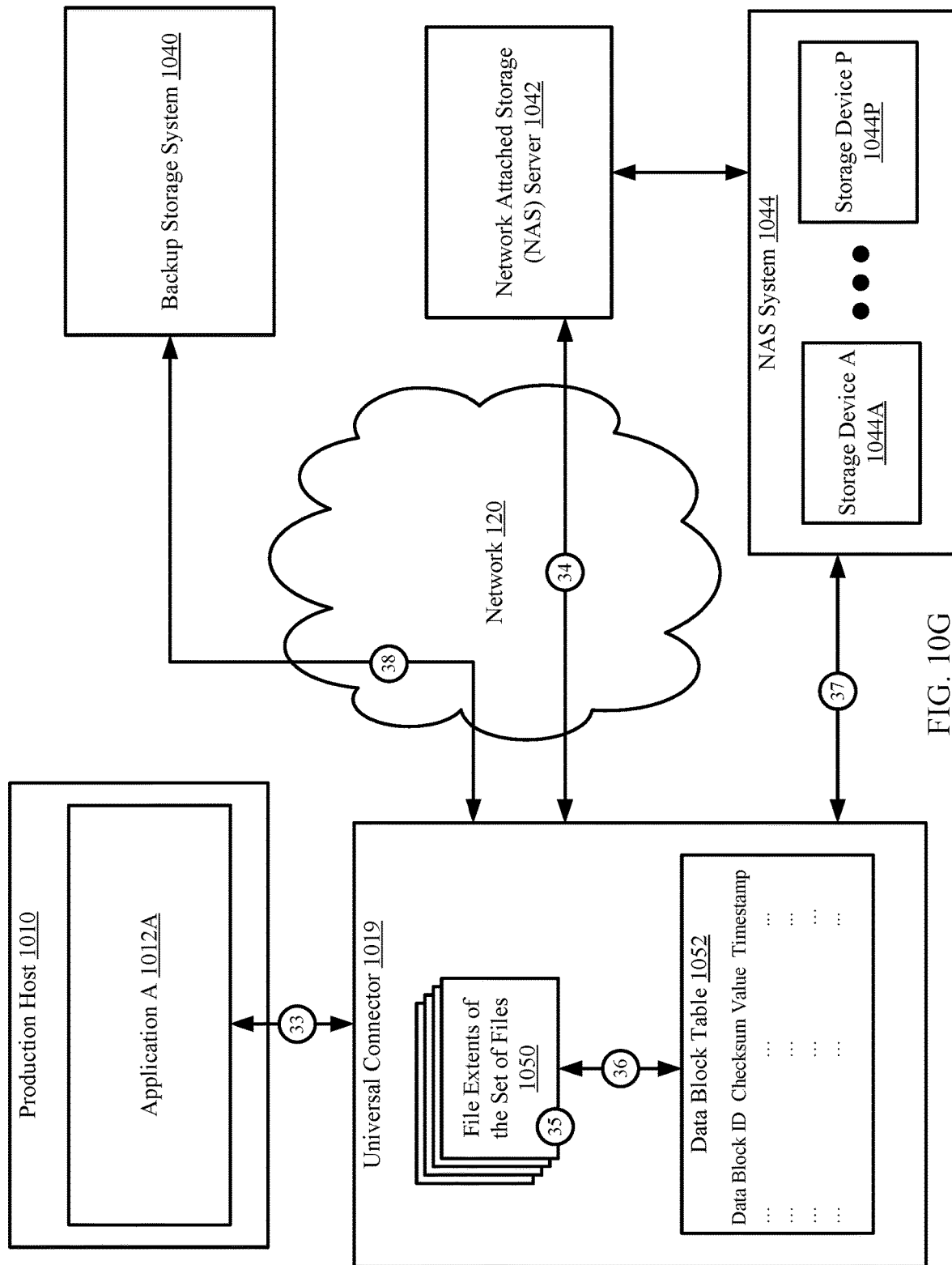

The following section describes an example. The example, illustrated in FIG. 10G, is not intended to limit the invention and is independent from any other examples discussed in this application. Turning to the example, consider a scenario in which an application utilizes a universal connector to obtain metadata for a set of files associated from a network attached storage (NAS) system.

Turning to the example, FIG. 10G shows a diagram of an example system. For the sake of brevity, not all components of the example system may be illustrated in FIG. 10G. The example system may include a production host (1010), a backup storage system (1040), a NAS server (1042), and a NAS system (1044). The production host (1010) includes application A (1012) and a universal connector (1019). The universal connector (1019) is operatively connected to the NAS server (1042) via a network (120). The NAS server (1042) is operatively connected to the NAS system (1044). The NAS system (1044) may include any number of storage devices (1044A, 1044P).

Application A (1012) may send an incremental backup request to the universal connector (1019) that specifies performing a block-based incremental backup of a set of files [33]. The incremental backup request may be sent in a virtual file system (VFS) protocol. The universal connector (1019), in response to obtaining the incremental backup request, performs the method of FIG. 8 to process the incremental backup request. Specifically, the universal connector (1019) sends a file extent request that specifies obtaining a set of file extents for the data blocks associated with the set of files [34].

The NAS server (1042), in response to receiving the file extent request, provides the set of file extents to the universal connector (1019). The universal connector (1018) obtains the set of file extents (1050) from the NAS server (1042) [35]. The file extents each include an offset, a range, and a checksum for a corresponding contiguous data. Continuing the servicing of the incremental backup request, the universal connector (1019), after obtaining the file extents (1050), compares the obtained file extents (1050) to a data block tale (1052) already stored in the production host (1010) [36]. The data block analysis includes comparing the obtained checksums to each checksum stored in the data block table (1052) and determined whether the checksums match. A subset of data blocks is determined where each checksum of the file extents (1050) do not match the corresponding checksums of the data block table (1052).

After determining the subset of data blocks, the data associated with the subset of data blocks is obtained from the NAS system (1044) [37]. While not illustrated in FIG. 10G, the data is obtained by generating a data access request that specifies obtaining the determined data and sending the data access request to the NAS server (1042). The NAS server (1042), in response to the data access request, accesses the requested data blocks from the NAS system (1044). The corresponding data is provided to the universal connector (1019). The universal connector (1019) obtains the data from the NAS server (1042). Continuing the servicing of the incremental backup request, the universal connector (1019), after obtaining the data of the subset of data blocks, generates the incremental backup of the set of files and stores the incremental backup in the backup storage system (1040) [38].

End of Example 7

Example 8

Figure 10H:
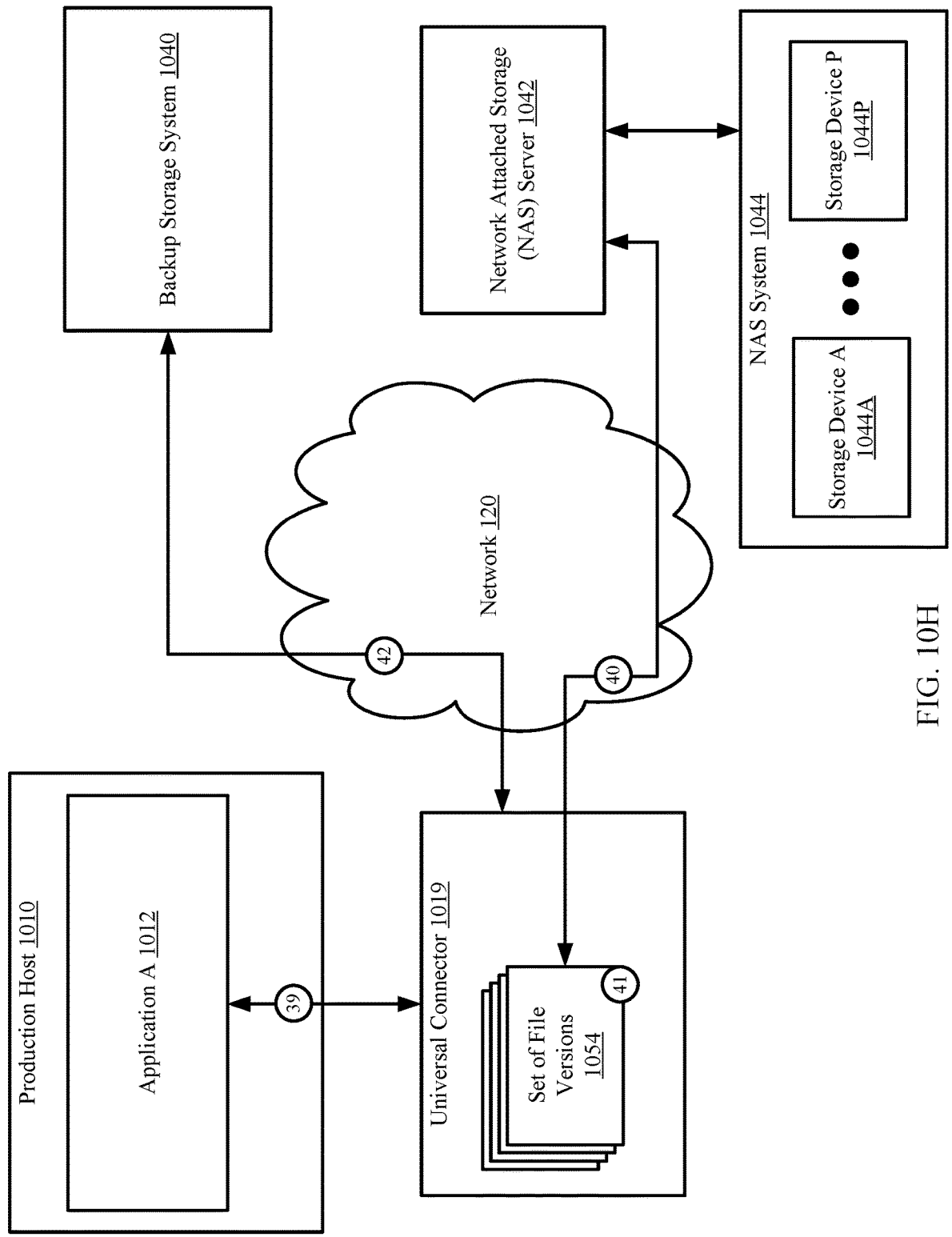

The following section describes an example. The example, illustrated in FIG. 10H, is not intended to limit the invention and is independent from any other examples discussed in this application. Turning to the example, consider a scenario in which two applications utilize a universal connector to generate a backup of a file that includes multiple versions each corresponding to a different point in time.

Turning to the example, FIG. 10H shows a diagram of an example system. For the sake of brevity, not all components of the example system may be illustrated in FIG. 10H. The example system may include a production host (1010), a backup storage system (1040), a NAS server (1042), a universal connector (1019) and a NAS system (1044). The production host (1010) includes application A (1012). The universal connector (1019) is operatively connected to the NAS server (1042) via a network (120). The NAS server (1042) is operatively connected to the NAS system (1044). The NAS system (1044) may include any number of storage devices (1044A, 1044P).

Application A (1012) may send a backup request to the universal connector (1018) that specifies performing a backup of a file and all file versions of the file [39]. The backup request may be sent in a virtual file system (VFS) protocol. The universal connector (1019), in response to obtaining the backup request, performs the method of FIG. 9 to process the backup request. Specifically, the universal connector (1018) determines the available set of file versions associated with the file using a file version table.

The NAS server (1042), in response to obtaining the data access request, accesses the NAS system (1044) to read the requested files. The NAS server (1042) may generate a response provides the corresponding data for the file versions to the universal connector (1018) [41]. The set of file versions (1054) are obtained by the universal connector (1019) [41]. A backup is stored in the backup storage system (1040) that includes the set of file versions (1054) [42].

End of Example 8

As discussed above, embodiments of the invention may be implemented using computing devices. FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

One or more embodiments of the invention may be implemented using instructions executed by one or more processors of the universal connector. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a universal connector, a backup request for a set of files;
in response to the backup request:
performing a batching of file read requests for data associated with the set of files to obtain a set of file read batches;
sending the set of file read batches to a network attached storage (NAS) server;
obtaining a response for each of the set of file read batches from the NAS server, wherein the response for each of the set of file read batches comprise a portion of the data, wherein at least two responses for the set of file read batches are obtained in parallel;
writing the portion of the data of the responses for each of the set of file read batches to a backup container in parallel with the obtaining of the responses; and
initiating a backup of the set of files using the backup container after the writing is completed.

2. The method of claim 1, wherein each file read batch of the set of file read batches comprises an offset of a previous file read batch and a batch size.

3. The method of claim 1, wherein the universal connector is operatively connected to a backup storage system, and wherein initiating the backup comprises storing the backup container in the backup storage system.

4. The method of claim 1, wherein the NAS server is operatively connected to a NAS system.

5. The method of claim 1, wherein the universal connector executes on a production host.

6. The method of claim 5, wherein the production host is operatively connected to the NAS server via a network.

7. The method of claim 1, further comprising:
prior to sending the set of file read batches, modifying a second set of file read batches to a format readable to the NAS server to generate the set of file read batches.

8. A non-transitory computer readable medium comprising computer readable program code, which when executed by a computer processor enables the computer processor to perform a method for managing data, the method comprising:
obtaining, by a universal connector, a backup request for a set of files;
in response to the backup request:
performing a batching of file read requests for data associated with the set of files to obtain a set of file read batches;
sending the set of file read batches to a network attached storage (NAS) server;
obtaining a response for each of the set of file read batches from the NAS server, wherein the response for each of the set of file read batches comprise a portion of the data, wherein at least two responses for the set of file read batches are obtained in parallel;
writing the portion of the data of the responses for each of the set of file read batches to a backup container in parallel with the obtaining of the responses; and
initiating a backup of the set of files using the backup container after the writing is completed.

9. The non-transitory computer readable medium of claim 8, wherein each file read batch of the set of file read batches comprises an offset of a previous file read batch and a batch size.

10. The non-transitory computer readable medium of claim 8, wherein the universal connector is operatively connected to a backup storage system, and wherein initiating the backup comprises storing the backup container in the backup storage system.

11. The non-transitory computer readable medium of claim 8, wherein the NAS server is operatively connected to a NAS system.

12. The non-transitory computer readable medium of claim 8, wherein the universal connector executes on a production host.

13. The non-transitory computer readable medium of claim 12, wherein the production host is operatively connected to the NAS server via a network.

14. The non-transitory computer readable medium of claim 8, further comprising:

prior to sending the set of file read batches, modifying a second set of file read batches to a format readable to the NAS server to generate the set of file read batches.

15. A system comprising:
a network attached storage (NAS) server;
a processor; and
a universal connector operating on the processor,
wherein the universal connector is programmed to:
   obtain a backup request for a set of files;
   in response to the backup request:
      perform a batching of file read requests for data associated with the set of files to obtain a set of file read batches;
      send the set of file read batches to a network attached storage (NAS) server;
      obtain a response for each of the set of file read batches from the NAS server, wherein the response for each of the set of file read batches comprise a portion of the data, wherein at least two responses for the set of file read batches are obtained in parallel;
      write the portion of the data of the responses for each of the set of file read batches to a backup container in parallel with the obtaining of the responses; and
      initiate a backup of the set of files using the backup container after the writing is completed.

16. The system of claim 15, wherein each file read batch of the set of file read batches comprises an offset of a previous file read batch and a batch size.

17. The system of claim 15, wherein the universal connector is operatively connected to a backup storage system, and wherein initiating the backup comprises storing the backup container in the backup storage system.

18. The system of claim 15, wherein the NAS server is operatively connected to a NAS system.

19. The system of claim 15, wherein the universal connector executes on a production host.

20. The system of claim 15, further comprising:
   prior to sending the set of file read batches, modifying a second set of file read batches to a format readable to the NAS server to generate the set of file read batches.

* * * * *